(12) United States Patent
Kitano et al.

(10) Patent No.: US 6,468,613 B1
(45) Date of Patent: Oct. 22, 2002

(54) LIGHT METAL/CFRP STRUCTURAL MEMBER

(75) Inventors: Akihiko Kitano, Ehime (JP); Kenichi Yoshioka, Ehime (JP); Kenichi Noguchi, Ehime (JP); Hitoshi Nishiyama, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/284,856

(22) PCT Filed: Aug. 20, 1998

(86) PCT No.: PCT/JP98/03690

§ 371 (c)(1),
(2), (4) Date: Apr. 20, 1999

(87) PCT Pub. No.: WO99/10168

PCT Pub. Date: Mar. 4, 1999

(30) Foreign Application Priority Data

Aug. 21, 1997 (JP) .............................. 9-224812
Nov. 21, 1997 (JP) .............................. 9-321467

(51) Int. Cl.[7] .............................................. B32B 15/08
(52) U.S. Cl. .................... 428/35.8; 428/35.9; 428/36.4; 428/36.9; 428/113; 428/418
(58) Field of Search ............... 428/35.8, 35.9, 428/36.4, 36.9, 113, 418

(56) References Cited

U.S. PATENT DOCUMENTS

| | | | | |
|---|---|---|---|---|
| 4,330,494 A | * | 5/1982 | Iwata et al. ............... | 264/46.2 |
| 4,421,827 A | * | 12/1983 | Phillips ..................... | 428/418 |
| 4,477,513 A | * | 10/1984 | Koga ......................... | 428/246 |
| 4,648,921 A | * | 3/1987 | Nutter, Jr. .................. | 156/77 |
| 4,671,985 A | | 6/1987 | Rodrigues et al. ........... | 428/215 |
| 4,957,995 A | * | 9/1990 | Saito et al. ................. | 528/99 |
| 5,112,418 A | * | 5/1992 | Pike ........................... | 156/319 |
| 5,324,587 A | * | 6/1994 | Nitowski et al. ........... | 428/469 |
| 5,979,684 A | * | 11/1999 | Ohinishi et al. ............ | 220/1.5 |

FOREIGN PATENT DOCUMENTS

| | | |
|---|---|---|
| EP | 0 056 713 A | 7/1982 |
| EP | 0 416 432 A | 3/1991 |
| GB | 1 512 735 A | 6/1978 |
| JP | WO97/03898 * | 2/1997 |

* cited by examiner

*Primary Examiner*—Harold Pyon
*Assistant Examiner*—Sow-Fun Hon
(74) *Attorney, Agent, or Firm*—Morrison & Foerster LLP

(57) ABSTRACT

Light metal/CFRP-made structural members which are characterized in that they are structural materials in which a CFRP material is stuck to the surface of a light metal material via an adhesive agent layer of thickness at least 10 μm and up to 500 μm, and the volume resistivity of the adhesive agent layer between said metal material and said CFRP material is at least $1 \times 10^{13}$ Ω.cm and, furthermore, the adhesive strength at room temperature is at least 15 MPa. In accordance with the present invention, since conventional light metal/CFRP structural materials can be made lighter and, furthermore, since the resistance to galvanic corrosion is outstanding and it is possible to markedly enhance the strength and the impact energy absorption performance, the development of applications and large-scale expansion into new fields becomes possible. Weight reduction and enhancing the durability and reliability of structures also makes a considerable contribution in terms of environmental protection.

21 Claims, 9 Drawing Sheets

LIGHT METAL/CFRP STRUCTURAL MEMBER

TECHNICAL FIELD

This invention relates to carbon fibre reinforced plastic (hereinafter abbreviated to CFRP) structural materials comprising light metal, carbon fibre and resin, which are structural materials for use as building materials, or for use in structures, motor vehicles, ships and the like.

TECHNICAL BACKGROUND

Hybrid materials in which a light metal such as aluminium and a carbon fibre reinforced plastic are stuck together have become popular in construction work/building and as structural materials for motor vehicles, ships and the like.

For example, because sections made of aluminium are lighter than sections made of steel, they are used as high-rise building members and the like, but because the elastic modulus of aluminium is low, at about ⅓ that of steel, in cases where section rigidity is important in design terms, it is necessary to enlarge the cross-sectional shape of the aluminium section compared to the case of steel. When the cross-sectional shape is enlarged the amount of material employed is increased and so it is not possible to achieve as much weight reduction as anticipated, and thus the merit of using aluminium sections is reduced. Hence, aluminium sections which are reinforced with carbon fibre reinforced plastic (herein-after abbreviated to CFRP) have been invented (Japanese Examined Patent Publication No. 53-32181).

Again, since motor vehicle bumpers made of aluminium are lighter than those made of steel, they have become popular for the purposes of enhancing motor vehicle fuel consumption and enhancing travel performance, but in the case of an aluminium material the impact behaviour is just simple and within the theoretically-calculated range, so door beams or bumper reinforcing materials in which aluminium and fibre reinforced plastics are combined have been proposed in Japanese Unexamined Patent Publication No. 6-101732 and in Japanese Unexamined Patent Publication No. 4-243643.

However, structural materials for construction work/ building, cars, rolling stock and the like are exposed to a high humidity environment at the time of the rainy season for example, so where a light metal and a CFRP have just been stuck together there has been the problem that, during prolonged use, galvanic corrosion occurs due to the natural potential difference between the two, leading to unforeseen damage to the member. Generally speaking, in cases where a light metal and CFRP are stuck together, it has been felt that the thinner the layer of adhesive agent the better (since the adhesive strength increases the thinner it gets, and also so as not to produce a layer of out-flowing adhesive agent when pressure is applied at the time of adhesion). In the inventions described in the aforesaid publications, the concept that it is only by providing a specified thickness of adhesive agent layer that strength, impact characteristics and also environmental resistance are realized, as found in the present invention, is not to be seen.

As a technique for preventing galvanic corrosion between a light metal and CFRP, there is disclosed in Japanese Unexamined Patent Publication No. 61-60772 the bonding of a metal panel and a CFRP with an acrylic adhesive agent containing glass beads of specified diameter. As is clear from the description on page 564 that "there are no restrictions with regard to the film thickness conditions", the idea in that publication is the simple way of thinking in circulation that galvanic corrosion can be avoided merely by mixing a glass material into the resin which forms the adhesive agent base (the base resin), but this not a highly reliable technique for avoiding galvanic corrosion. If the insulating property of the base resin in the adhesive agent is inadequate prior to the addition of the glass beads, then no matter what amount of glass beads is added moisture and ionic substances will readily pass through the resin and galvanic corrosion will be produced. Moreover, there has also been the problem that unless, as disclosed in the present invention, the adhesive strength is at a specified level (in said publication, the adhesive strength is 7.6 MPa), galvanic corrosion inevitably proceeds (when exposed outdoors or in a high temperature high humidity environment in which oxygen and moisture are jointly present, rather than in water).

The objective of the present invention lies not just in resolving the aforesaid problem of structural materials comprising a light metal and CFRP so that no galvanic corrosion occurs, but also in providing extremely practical light metal/ CFRP hybrid structural materials which are lightweight and outstanding in their rigidity, strength and impact resisting performance.

DISCLOSURE OF THE INVENTION

In order to realise the aforesaid objective, the present invention basically has the following constitution. It comprises light metal/CFRP-made structural members which are characterized in that they are a structural material in which a CFRP material is stuck to the surface of a light metal material via an adhesive agent layer of thickness at least 10 $\mu$m and up to 500 $\mu$m, and the volume resistivity of the adhesive agent layer between said metal material and said CFRP material is at least $1\times10^{13}$ $\Omega$.cm and, furthermore, the adhesive strength at room temperature is at least 15 MPa.

As stated above, in order to manifest the mechanical properties of a structural member and to prevent galvanic corrosion, it is necessary to ensure that there is a specified thickness of adhesive agent between the light metal and the CFRP. Furthermore, since galvanic corrosion is produced when the moisture absorbed by the adhesive agent layer forms an electrical circuit, it is necessary that the insulation property of the adhesive agent layer itself be at least a certain value when moisture is absorbed. That is to say, the volume resistivity of the adhesive agent itself needs to be at least a specified value. Moreover, it is further preferred that the value of the volume resistivity when moisture has been absorbed is at least a specified level.

Furthermore, what the present inventors have newly discovered is the fact that much of the galvanic corrosion of a structural material is brought about because of an insufficient interfacial adhesive strength. That is to say, if the adhesive strength is below a specified level, then due to the high stresses acting at the interface microscopic cracks are generated within the adhesive agent layer forming pathways for galvanic corrosion, and/or if the adhesive strength is below a specified value then microscopic local separation occurs at the adhesion interface, forming stopping places for the moisture which is the medium of galvanic corrosion, and so galvanic corrosion is brought about. Thus, in order to prevent galvanic corrosion of the structural material, the adhesive strength must be at least a specified level. In other words, by specifying both the insulation property and the adhesive strength, it has become possible for the first time to put to practical effect a highly reliable structural material which is free of galvanic corrosion.

Since, in the art of aforesaid Japanese Unexamined Patent Publication No. 61-60772, the thickness of the adhesive agent layer is not controlled and since the metal sheet and CFRP are not stuck together sufficiently firmly (in Japanese Unexamined Patent Publication No. 61-60772 the adhesive strength is 76 kg/mm$^2$), in a real environment of high temperature and high humidity there is galvanic corrosion of the structural material.

EXPLANATION OF THE NUMERICAL CODES

1: light metal/CFRP structural member
2: light metal material (aluminium or the like)
3: CFRP material
4: adhesive agent layer
4-$a$: adhesive agent A
4-$b$: adhesive agent B
5: foam material
6: corner portion

OPTIMUM CONFIGURATION FOR PRACTISING THE INVENTION

Figure 1:
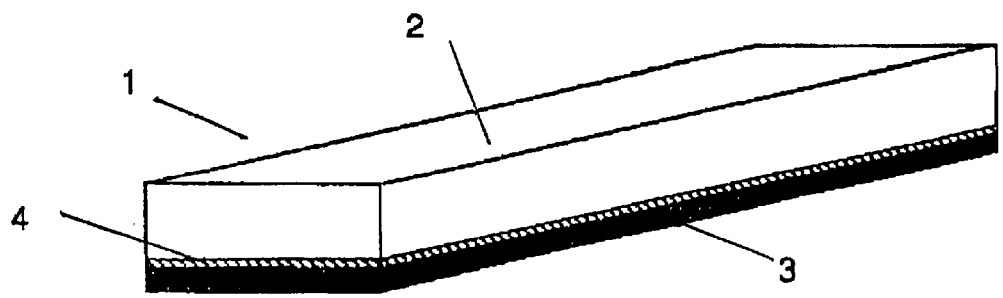
FIG. 1 is a schematic diagram of a flat-shaped member relating to a practical embodiment of the invention.

In the present invention, light metal means a light metal material comprising aluminium, an aluminium alloy, magnesium, a magnesium alloy or the like, and the light metal/CFRP structural material (1) comprises said light metal (2), carbon fibre reinforced plastic (CFRP) material (3) and adhesive agent layer (4) (FIG. 1).

Firstly, let us consider the adhesive agent layer (4), which is one of the most important structural elements of the present invention, this does not merely bond together the light metal and the CFRP but is present as one of the structural elements of the structural material, and as well as having a role in preventing galvanic corrosion between the light metal and the CFRP it also has a load transmitting role between the metal material and the CFRP in order to function as a structural material (in order to manifest the undermentioned strength and impact energy absorption characteristics).

The thickness of the adhesive layer is preferably from 10 to 500 $\mu$m. This differs from the conventional view that the thinner the adhesive layer the better (by stress analysis or the like, a thickness which can be disregarded is preferred). This is because, if the thickness of the adhesive agent layer is less than 10 $\mu$m, then, especially where the structural material is large, there is the possibility of regions being produced where no adhesive agent has been applied, and there is the possibility of the galvanic corrosion described below occurring in these regions, while for more than 500 $\mu$m, it takes a number of applications to achieve this level of thickness and it is expensive. More preferably, the thickness of the adhesive agent layer is 20–500 $\mu$m, and still more preferably 50–500 $\mu$m.

Now, the thickness of the adhesive agent layer can be determined by observation of the cross-section with an optical microscope at a magnification of 50 to 100 times. Where the thickness varies, an average thickness of ten randomly sampled places is taken as the thickness.

The thickness of the adhesive agent layer can be adjusted by any known means. For example, adjustment can be carried out by adjusting the viscosity of the adhesive agent and the timing of the pressure applied or, as discussed below, adjustment is possible by mixing thermoplastic resin in the adhesive agent. More specifically, bonding is performed by pressure application at a face pressure of about 0.001. to 0.1 MPa at a viscosity of 500–2000 poise. As discussed below, the layer thickness can also be secured by firstly applying just the required amount of adhesive agent and then applying a pressure such that there is no out-flow of adhesive agent at the time of the pressure application. Again, it is also possible to insert between the light metal and the CFRP a spacer of the required thickness which does not undergo deformation at the time of the pressure application. Moreover, this spacer itself may be an electrically insulating reinforcing fibre layer. That is to say, providing that it has outstanding adhesion properties, the adhesive agent layer itself may be an insulating FRP layer.

Moreover, since galvanic corrosion is produced by the formation of microscopic electrical circuits between the light metal and the CFRP, as stated above, it is necessary that the value of the volume resistivity of the adhesive agent layer be at least $1\times10^{17}$ $\Omega$.cm The volume resistivity may be as high as possible, and about $1\times10^{17}$ $\Omega$.cm is practically realizable. On the other hand, at the same time the adhesive strength at room temperature needs to be at least 15 MPa.

The volume resistivity here can be measured in accordance with JIS K6911. The volume resistivity of the adhesive layer in a previously-bonded member can be measured based on JIS K6911 in a state with the adhesive layer affixed to the aluminium material, after having peeled off or shaved off the CFRP layer.

Now, if the volume resistivity is less than $1\times10^{13}$ $\Omega$.cm, electrical circuits which bring about the undermentioned galvanic corrosion when moisture has been absorbed are readily formed, while in order to achieve a value of more than $1\times10^{17}$ Ω.cm the composition of the adhesive agent itself becomes complex and it is expensive. A more preferred range is from $1\times10^{14}$ Ω.cm to $1\times10^{17}$ Ω.cm.

The adhesive strength can be measured based on JIS K6850. The adhesive strength of an already bonded member can also be measured based on JIS K6850 by shaving off CFRP and/or light metal portion in such a way that the bonded joint remains. Now, room temperature refers to the range 21° C. to 26° C.

The reason why the adhesive strength is at least 15 MPa is to suppress micro-cracks and to suppress microscopic separation when used over a long period, as stated above, and also for the mechanical properties to be manifested. At least 20 MPa is more preferred.

The volume resistivity of the adhesive agent tends to fall with the absorption of moisture, so it is further preferred that the volume resistivity when moisture has been absorbed is from $1\times10^9$ to $1\times10^{15}$ Ω.cm. If it is less than $1\times10^9$ then the electrical circuits which bring about galvanic corrosion when moisture has been absorbed are readily formed, while in order to have a value of more than $1\times10^{15}$ Ω.cm the composition of the adhesive agent itself becomes complex and it is expensive. A still more preferred range for the volume resistivity when moisture has been absorbed is the range above $1\times10^{10}$, with the range above $1\times10^{11}$ Ω.cm still further preferred. Now, 'when moisture has been absorbed' indicates the state when the adhesive agent has been exposed for 40 days to an atmosphere of temperature 60° C. and relative humidity 85% and measurement can be carried out in accordance with JIS K6911 in the same way as for the volume resistivity above. The volume resistivity of the adhesive layer of an already bonded member can be measured based on JIS K6911 in the state with the adhesive layer affixed to the aluminium material, after having peeled off or shaved off the CFRP layer.

Now, the adhesive strength tends to fall with the absorption of moisture but, when moisture has been absorbed, since the adhesive agent softens and its stretchability increases (so stresses are lowered), the micro-cracks which are a cause of galvanic corrosion occur less readily, so it is preferred that the adhesive strength when moisture has been absorbed is at least 9 MPa. More preferably it is at least 14 MPa.

Again, structural materials are subject to direct sun-light and are employed under high-temperature conditions such as in environments in which fires are used. As the temperature rises, so the adhesive agent tends to soften (its stretchability increases), so it is further preferred that the adhesive strength at a temperature of 60° C. be at least 8 MPa. By fulfilling this condition, the prevention of galvanic corrosion over long periods in structural materials subject to severe temperature and humidity changes becomes still more reliable.

Moreover, by fulfilling this condition, not just galvanic corrosion, but also physical properties such as the high temperature vibration damping characteristics and impact absorption characteristics are stabilized, and more highly reliable structural materials are formed.

As examples of adhesive agents which satisfy the above properties, there are those in which the chief component is a phenolic, epoxy, unsaturated polyester, polybenzimidazole, acrylic (SGA), resorcinol, urea, acrylate diester, silicone, melamine or other such type of thermosetting adhesive agent, polyamide, acrylic (PMMA), polyurethane, unsaturated polyester, polyvinyl alcohol, polyvinyl acetal or other such type of thermoplastic adhesive, or polysulphide, silicone rubber, butadiene-styrene rubber (SBR), chloroprene rubber or other such type of elastomer-based adhesive.

Amongst these adhesive agents, an alloy type adhesive agent based on a combination from different groups is also preferred. Specific examples are epoxy-nylon, epoxy-phenolic, epoxy-polysulphide, chloroprene-phenolic, nitrile-phenolic, vinyl-phenolic, vinyl acetal-phenolic and the like.

From amongst the above, epoxy resins, phenolic resins, polyamide resins and the like are especially preferred for bonding aluminium and a FRP. Of these, an adhesive strength of over 15MPa can be obtained by mixing from 0.3 to 1.0 part by weight of a silane coupling agent such as an epoxy silane with an epoxy resin, so this is preferred.

Again, phenolic adhesive agents are fire retarding, and so are preferred adhesives in cases where structural material fire retardancy is required such as building applications, motor vehicles, railway rolling stock and the like.

Furthermore, in order to obtain a volume resistivity lying within the aforesaid range when moisture has been absorbed, it is possible to mix a thermoplastic resin such as polyamide, vinyl chloride, polystyrene, ABS resin, methacrylate resin, fluoroplastic or polyethylene resin which has a large volume resistivity when moisture has been absorbed, with, for example, an epoxy adhesive agent to adjust the volume resistivity when moisture has been absorbed such that it lies within the aforesaid range. In such circumstances, as examples of the preferred form of the thermoplastic resin which is to be mixed, there are the granular, powder, nonwoven fabric, woven fabric and mesh forms. It is also possible to adjust the thickness of the adhesive agent layer by employing these.

Furthermore, as another preferred means for increasing the volume resistivity when water has been absorbed, there is the mixing, into an epoxy resin, of two or more types of inorganic material of about the same particle diameter such as silica particles, alumina powder, glass fibre powder and the like. Specifically, there are used silica particles of secondary particle diameter about 5 μm to 50 μm, alumina powder of particle diameter about 1 to 100 μm and glass fibre powder of fibre length 10 to 50 μm. This is because in these ranges the different particles within the adhesive agent layer are essentially uniformly mixed together due to interactions and the absorbed moisture moves in a complex manner through the adhesive layer, so that the galvanic corrosion preventing effect when moisture has been absorbed is further enhanced. The amount of the mixed inorganic material is 2 to 8 wt % in the case of the alumina powder, 0.5 to 3 wt % in the case of the glass fibre powder and 3 to 10 wt % in the case of the silica particles. Again, the adding of the inorganic particles also has the effect of enhancing the heat resistance of the adhesive agent layer.

The physical form of the adhesive agent may be that of an aqueous solution, solution or emulsion (latex), or it may have a solvent-free form, a solid form or tape form.

An aqueous solution type is an adhesive agent of form based on the dissolving of a synthetic resin or the like in water, and examples include urea, phenolic and polyvinyl alcohol adhesives.

A solution type is one where a synthetic resin or elastomer has been dissolved in an organic solvent, and examples range from those of low viscosity for which spray application is possible to those of high viscosity which are applied with a caulking gun.

An emulsion type is one where minute particles of the synthetic resin or elastomer are dispersed in water by the action of a surfactant.

A solvent-free type is one designed such that curing takes place by chemical reaction of monomer or oligomer to form the adhesive coating, and it is characterized in that it does not contain organic solvent.

A solid form adhesive denotes a powder, block, string or film form of adhesive agent, and it is a hot melt adhesive employed by hot fusion bonding.

A tape form is an adhesive agent which has been fabricated in the form of a tape, and there are tacky and heat seal types. In cases where the adhesion surface is very uneven, a paste-form adhesive agent is more preferred, and where the adhesion area is large, then a film-form adhesive agent is preferred.

The aforesaid liquid adhesive agents may be of the one-part type or a mixed type with two or more component parts.

In terms of the adhesive agent curing conditions, selection from amongst cold curing, hot curing and energy irradiation curing types is preferred. As examples of cold curing types, there are the addition polymerization type adhesive agents typified by epoxy and urethane adhesives, catalyst-cured adhesives, the moisture-cured type typified by cyanoacrylate and urethane adhesives, anaerobic adhesives, and radical-polymerizing adhesives typified by acrylic and micro-encapsulated type adhesives.

Since the residual thermal stresses produced at the time of curing are lower with cold curing adhesive agents than with hot curing adhesives, they have the merit that it is possible to increase the adhesive strength. In particular, since residual thermal stresses are higher in the edge regions of a structural material (due to stress concentration), there is the possibility of galvanic corrosion progressing with the advance of microscopic cracks and separation from the edge regions, and by lowering the curing temperature it is possible to enhance the galvanic corrosion resistance. Between aluminium and a unidirectional CFRP, there is more than four times the difference in thermal expansion coefficient than in the case of steel and a unidirectional CFRP, so by using a cold-curing type adhesive agent it is possible to further enhance the galvanic corrosion prevention effect.

As examples of the hot curing type, there are the melting/cooling type adhesives typified by hot melt adhesives, the addition reaction type adhesives typified by epoxy and urethane adhesives, and the high frequency heating type adhesives typified by the nylon and electromagnetic induction type adhesives. As examples of the energy irradiation curing type, there are the ultraviolet irradiation type adhesives typified by acrylic and epoxy adhesives, the laser irradiation type adhesives typified by acrylic adhesives, the microwave irradiation type typified by acrylic adhesives, the pressure sensitive type and the moisture-curable type. With regard to the specific heating temperature, for the purposes of securing the aforesaid adhesive strength at 60° C., it is preferred that the heating temperature be at least 80° C. and desirably at least 1000.

Moreover, in structural applications, semi-solid adhesive agents known as curable tacky adhesives are also preferred where instantaneous adhesion is effected by tacky adhesion and then this is converted to permanent adhesion along with the curing reaction. Adhesives comprising components extracted from marine proteins or animal/vegetable proteins, which are known as bio-adhesive agents are preferred in fields where biodegradability is desired.

For the application of the adhesive agent there is used a simple application tool such as a spatula, brush, rod, syringe or oiler, or a roller such as hand roller, roller fitted with a reservoir, or a roller coater, a cylinder gun system such as a caulking gun or sealant gun, a flow gun, flow brush, spray gun or other such pressurized reservoir system, or a pressure delivery pump (plunger pump) system of flow gun, spray gun or flow coater, or a two-part mixing pressure delivery system or the like. The form of the application can be as dots, lines, strips or as an overall coat. The application may be carried out as a continuous operation, semi-continuous operation or non-continuos operation.

Of these, a flow gun, flow coater or other such automatic device with which metering is possible is the preferred method of application in terms of thickness uniformity, ready control of the amount of adhesive and the galvanic corrosion prevention effect.

Figure 2:
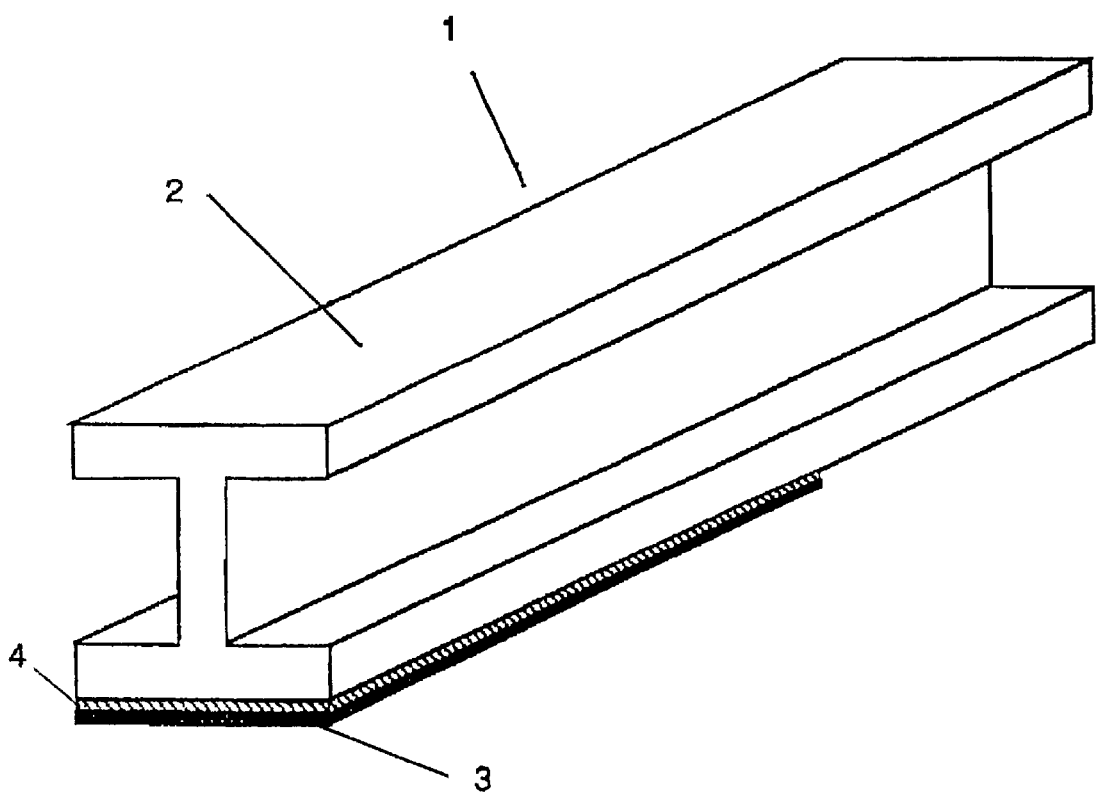
FIG. 2 is a schematic diagram of an I beam-shaped member relating to a practical embodiment of the present invention.
Figure 3:
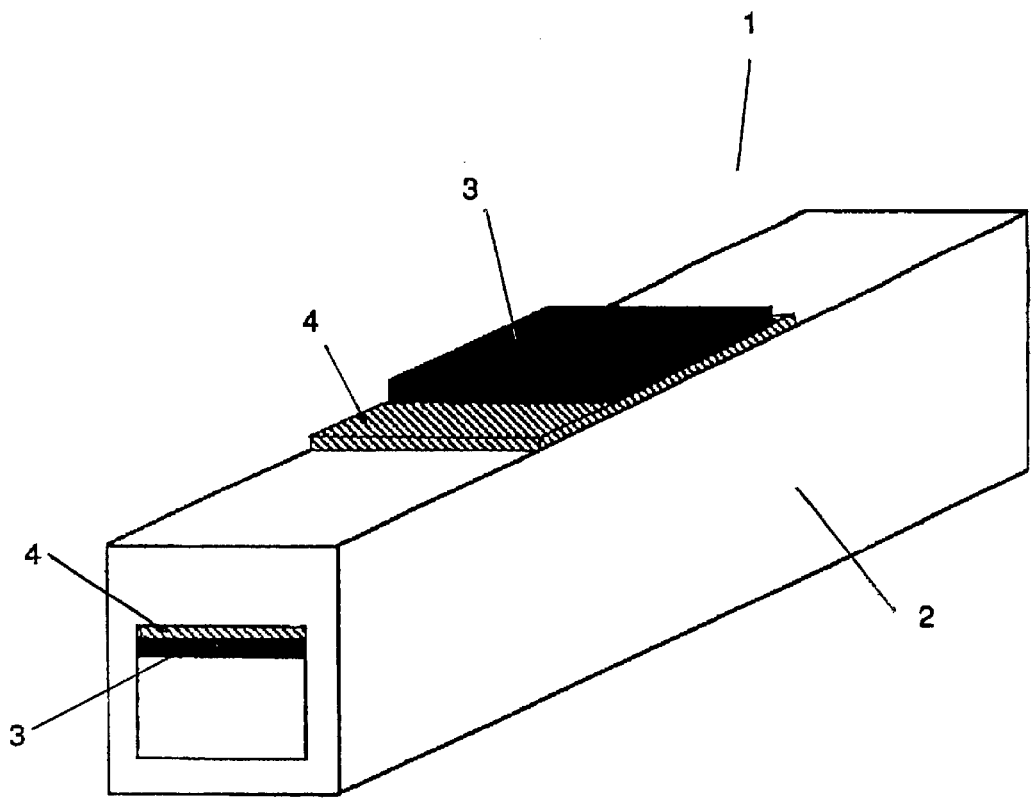
FIG. 3 is a schematic diagram of a square beam-shaped member relating to a practical embodiment of the present invention.
Figure 4:
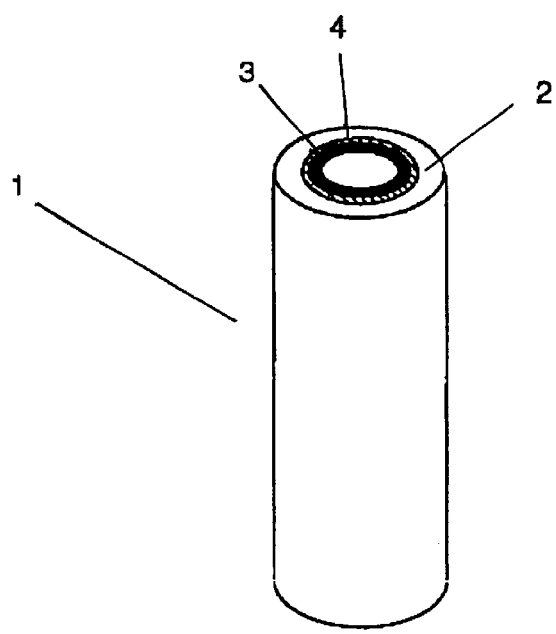
FIG. 4 is a schematic diagram of a columnar member relating to a practical embodiment of the present invention.

The light metal referred to in the present invention is a metal such as aluminium, magnesium or an light metals of these, of specific gravity 3.0 g/cm$^3$. Preferred alloys are aluminium or aluminium alloys, typically sections, sheets, pipes or other such rod-shaped materials, tubes and plates (FIG. 2, FIG. 3 and FIG. 4).

The aluminium or aluminium alloy (hereinafter simply referred to as aluminium) is not particularly restricted, but examples are all those from series 1000 to 8000 as defined by the JIS. Preferably, the density is within the range 2.5 g/cm$^3$ to 2.8 g/m$^3$ and the elastic modulus is within the range 65 GPa to 77 GPa. Pure aluminium, which is series 1000, is outstanding in its formability and corrosion resistance, and Al—Cu—(—Mg) alloys, which are series 2000, are outstanding in their strength and toughness. Al—Mn alloys, which are series 3000, are outstanding in their formability and Al—Si alloys, which are series 4000, are characterized by high strength. Series 5000 Al—Mg alloys are outstanding in their formability, while series 6000 Al—Mg—Si alloys are outstanding in their strength, toughness, formability and corrosion resistance. Series 7000 Al—Zn(—Mg) alloys are especially outstanding in their strength and toughness. For section materials, there are used Al—Mn alloys 3005 and 3105 which are outstanding in their strength and corrosion resistance, or pure aluminium 1100 and 1200 which become somewhat whitish in appearance after anodizing. Again, the typical extrusion alloy 6063 is a suitable material for obtaining section materials with a complex cross-sectional shape.

Now, reference to aluminium sections in the present invention includes of course the extruded sections (solid sections and hollow sections) referred to in JIS standards H4100 and 4180, and also the extruded pipes (port hole extruded pipes, mandrel extruded pipes) referred to in JIS standards H4080 and H4180, the drawn pipes referred to in JIS standard H4080, and the extruded rods, drawn rods and drawn wires referred to in JIS standards H4040 and Z3232, long beam-shaped members outside the JIS specifications (pipes, square-shaped pipes, angles, channels, C-shape, T-shape, I-beams, flat plates, bars, supporting struts and girders), rod shaped elongated materials, plate materials, rod shaped, tubular shaped and column shaped sections formed by casting and forging, sections with a lengthwise taper, sections with discontinuous projections in the lengthwise direction and sections with holes.

In terms of size, the width and height (in the case of a sheet-shaped body, the thickness) is broadly from 1 mm to 500 mm, and the length from about 10 cm to 30 m. At the time of use, section materials of these sizes can also employed after cutting or welding/joining.

Now, it is preferred in relation to the aforesaid adhesive strength that the surface of the light metal be subjected to a mechanical or chemical surface treatment. In the case of aluminium, the surface is preferably given a surface treatment as described in JIS K6848 which is normally referred to as a pre-treatment.

As a specific example, the surface of the aluminium is abraded and washed. The abrading is carried out by means of abrasive paper (sandpaper), a buff, a belt sander, sand blasting, a wire brush or by a jet of high pressure liquid. The washing method may be an immersion washing method with or without agitation or while applying ultrasonic waves, or a spray washing method, a vapour bath washing method, a wiping washing method or the like. As solvents employed in the washing, there are acetone, MEK, desalted water, isopropyl alcohol, trichloro-ethylene, trichlorotrifluoroethane, water-soluble detergents and the like. In order to obtain a particularly high adhesive strength, a chemical treatment in a treatment liquid comprising sodium bichromate, concentrated sulphuric acid and water is preferred. In such circumstances, if the treatment bath temperature is raised, more effective treatment may be carried out. Again, a 30–50 minute anodizing treatment in chromic acid with the application of 10–30 volts is also preferred. Moreover, the method referred to as the phosphoric acid anodizing method in which a 10–30 minute anodizing treatment is carried out in a phosphoric acid bath with the application of 10–20 volts is also a chemical treatment method for obtaining an extremely high adhesive strength. Furthermore, for obtaining still higher adhesion properties, vapour degreasing in per-chloroethylene and an alkali wash, followed by water washing, a deoxidizing treatment, water washing, a phosphoric acid anodizing treatment, water washing, heating and drying, and a primer treatment, is preferred.

Again, reducing the electroconductivity by forming a 3 $\mu$m to 40 $\mu$m oxide layer on the aluminium surface is also effective in terms of preventing galvanic corrosion at the CFRP surface. As specific treatments, there are the formation of barrier coatings and porous coatings by anodizing, but porous coatings which can raise the thickness are preferred. A porous coating where the thickness lies in the range 3 $\mu$m to 40 $\mu$m is particularly preferred. It is further preferred that the porous coating be an oxalic acid coating, ammonium borate coating, phosphoric acid coating or chromic acid coating. Of these, most preferred is a structurally-regular oxalic acid coating, or an ammonium borate coating in which there are very few minute pores.

The oxalic acid coating can be formed for example by carrying out an anodizing treatment at a temperature of 20–30° C. and at a current density of 1 to 4 A/dm$^2$ in electrolyte of oxalic acid concentration 2 to 6%. The ammonium borate coating can be formed for example by carrying out an anodizing treatment at a temperature of 80–120° C. and at a voltage of 100 to 220 V in electrolyte of ammonium borate concentration 4 to 6%.

Again, it is also preferred that there be applied to the aluminium surface a resin known as a primer of the same resin system as the adhesive (for example, in the case where an epoxy resin adhesive is used, the primer will contain an epoxy resin as its chief component), and then semi-curing or curing carried out prior to the application of the adhesive. In such circumstances, it is possible to regard the primer thickness too as a thickness of the adhesive agent layer.

Now, in order to enhance the impact energy absorption performance shown in the examples, a 2000, 5000 or 7000 series aluminium alloy is preferred. Furthermore, in order to increase the amount of impact energy absorption, a 1000, 6000 or 7000 series aluminium alloy is preferred.

Again, in terms of shape, rather than a solid object a hollow form is preferred in that the weight can be reduced. As explained below, in the case of an impact energy absorbing member, it is highly desirable for it to be hollow. Furthermore, a hollow member has the merit that the progress of galvanic corrosion can be inspected from the inside. Moreover, hollow sections are particularly preferred as structural bodies used in large quantities, because the forming costs are lower.

The carbon fibre reinforced plastic (CFRP) (3) referred to in the present invention comprises at least a resin and reinforcing fibre which includes carbon fibre, and it has the function of enhancing the rigidity and strength which are the weak points of light metals, together with the role of enhancing the impact energy absorption performance.

The carbon fibre is a carbon fibre (also known as graphite fibre) produced from polyacrylonitrile fibre or pitch as the starting material via oxidation and carbonizing/graphitizing stages, and high-strength and high-modulus types are marketed, of single fibre diameter 5 to 10 $\mu$m. Generally speaking, the carbon fibre is employed in the form of strands in which are bundled single fibres (monofilaments) in units of from several thousand up to several hundreds of thousand.

In the present invention, a PAN-based carbon fibre of elastic modulus from 200 to 500 GPa and tensile strength from 2.2 GPa to 10 GPa, having a good balance of strength and elastic modulus as a structural material, is preferred. In particular, a tensile strength of 3.5 GPa to 10 GPa is preferred in that, even in the case of galvanic corrosion, a residual strength is ensured at the time of galvanic corrosion (even where galvanic corrosion has occurred, the structural material does not undergo outright failure). Furthermore, a tensile strength of 4 GPa to 10 GPa is still further preferred in terms of the undermentioned impact energy absorption.

In the present invention the carbon fibre is used in strand form and roving form in which strands are bundled together, but it is preferred that the fuzz on the strands as determined by the measurement method given in Japanese Examined Patent Publication No. 1-272867 be no more than 30 per meter. This is because, if there is more fuzz than this, then fibre breaks arise during moulding and these fibres rise up to the surface of the CFRP and trigger unexpected galvanic corrosion. Again, where there is considerable fuzz, it becomes difficult to obtain long structural materials.

As examples of the resin from which the CFRP of the present invention is composed, there are thermosetting resins such as epoxy resins, phenolic resins, benzoxazine resins, vinyl ester resins and unsaturated polyester resins. Furthermore, thermoplastic resins such as polyethylene, polypropylene resin, polyamine resin, ABS resin, polybutylene terephthalate resin, polyacetal resin and polycarbonate resin are also preferred. In the present invention, resistance to galvanic corrosion is secured by the adhesive agent layer, but where the moisture absorption of the CFRP is itself low this is useful in suppressing galvanic corrosion. As a specific measure, it is preferred that the level of moisture absorption of the resin in the CFRP be less than 10%. The moisture absorption of the resin can be determined by measurement with the resin itself immersed for 7 days in water at 70° C. or by immersing the CFRP in water at 70° C. in the same way and calculating from the weight ratio in terms of the carbon fibre (the moisture absorption of the carbon fibre can be assumed to be zero).

Amongst the aforesaid resins, epoxy resins, polyester resins and vinyl ester resins which are suitable for the undermentioned pultrusion and, furthermore, are outstanding in their chemical resistance and weatherability are preferred as structural materials. Again, phenolic resins and benzoxazine resins have excellent flame retardancy, and there is little generated gas when they burn, so they are preferred for building materials or for use in construction. Epoxy resins are most preferred for the manifestation of CFRP strength at the time of impact and enhancing the impact energy absorbing performance.

Flame retardancy may also be conferred by incorporating a known flame retardant such as a phosphate ester, halogenated hydrocarbon, antimony oxide, zinc borate, phosphorus-containing polyol, bromine-containing polyol, tetrachlophthalic anhydride or tetrabromophthalic anhydride in the aforesaid resins. In such circumstances, when the resins burn, gases which adversely affect the body may be generated from these flame retardants, so the amount of flame retardant incorporated should be restricted to a suitable amount.

Now, if there is included in the reinforcing fibre a non-electroconductive reinforcing fibre as well as the carbon fibre, this is preferred in terms of preventing galvanic corrosion. However, the amount of the reinforcing fibre other than carbon fibre is preferably lower than the weight of the carbon fibre so that characteristics such as the light weight, high stiffness and high strength of the carbon fibre are not impaired.

As examples of the non-electroconductive reinforcing fibre employed along with the carbon fibre, there are glass fibre, aramid fibre, nylon fibre, polyethylene fibre and other such synthetic fibres, and these can be arranged in the resin in a regular or irregular fashion in the form of long or short fibre, or in a woven or mat form (or a mixture of these forms). Furthermore, it is also preferred that the carbon fibre be covered with the non-electroconducting fibre.

Amongst these reinforcing fibres, glass fibre is cheap and has a good balance of compression/tensile strength so is preferred. Now, reference here to glass fibre means fibres of a glass such as so-called E glass, C glass or S glass, in which the chief component is silicon dioxide ($SiO_2$), and where the fibre diameter is about 5 to 20 $\mu$m. If a cloth, referred to as a scrim cloth, of thickness about 10 $\mu$m to 100 $\mu$m comprising glass fibre is arranged on the face contacting the light metal, the galvanic corrosion resistance is markedly enhanced. Again, as well as enhancing the galvanic corrosion resistance, a glass mat can prevent the propagation of carbon fibre damage, and it enhances resin impregnation at the time of moulding and eases residual stresses between the reinforcing fibres. Moreover, a glass mat is useful in enhancing the impact resistance Any known moulding technique can be used as the CFRP (which may include reinforcing fibre other than carbon fibre) moulding method, such as the pultrusion method, pull-winding method, filament winding method, hand lay-up method, resin transfer moulding (RTM) method or SCRIMP method. Of these, integral moulding while impregnating the fibre bundles containing the carbon fibre with resin using the pultrusion method or the pull-winding moulding method is economic. In the case of these methods, if the moulding is carried out using a number of parallely-arranged carbon fibre tows comprising 3,000–200,000 carbon fibre monofilaments sized with an epoxy resin, phenolic resin, polyamide resin or polyurethane resin, the work efficiency is good and a high quality uni-directional CFRP is obtained, so this is preferred.

Again, the hand lay-up method is suitable for low levels of production or for complex/special structures. In the case of this hand lay-up method or the autoclave method, if there is used a prepreg comprising carbon fibre tows impregnated with a resin such as an epoxy resin or phenolic resin, the work efficiency is good and a high quality unidirectional CFRP is obtained, so this is preferred.

With the light metal/CFRP structural materials of the present invention, the galvanic corrosion resistance is markedly enhanced, but because a specified adhesive agent layer thickness and adhesive strength are ensured, novel effects other than galvanic corrosion prevention are also realised. Specifically, the flexural strength and impact absorption energy characteristics are enhanced compared to the case where a light metal and CFRP are merely bonded together. As specific applications, they are suitable as load bearing members or impact resisting members in the construction/building components fields and for motor vehicles, ships, rolling stock, aeroplanes and the like.

Structural materials for construction/building use means the members employed in any constructions such as wood frame, steel frame, cement mortar or brick-built private houses, large buildings built of reinforced concrete, high-rise buildings, chemical plant and other such factories, warehouses, sheds, agricultural greenhouses and horticultural hot houses, solar houses, pedestrian bridges, telephone boxes, mobile toilets/showers, garages, terraces, benches, guard rails, advertising pillars, huts, hutches for pets, tents, storerooms, prefabs and other such small-size simple frame buildings, and the like.

Locations where sections are used are very diverse, and examples are water storage tank reinforcing materials on the roofs of buildings, duct reinforcing materials, pool materials, door and window frames (so-called sashes), the crosspieces of eaves, beams for ceilings and floors, sills, room partitioning materials, side wall materials, lintels, pillars, partition frames for dividing rooms, eaves gutters, scaffolding and the like With regard to structural materials for cars and rolling stock, wide use is possible in applications such as motor vehicle bodies, frames of various kinds, sub-frames, various kinds of rods, bumpers, bumper reinforcing materials, impact beams, side beams, side pillars and the like. Again, application is also possible in the cars/wagons or bodies of trains and trucks, and other such frames. As examples of aircraft structural materials, there are the main wings, tail wings, propellers and the like, and also the fuselage.

In the aforesaid structural body applications, either by covering all or a part of the surface of the light metal material with the CFRP material (FIG. 2), or by bonding them in a form with the CFRP inserted into a hollow region or groove in the light metal material (FIG. 3), it is possible to produce a load bearing member and/or impact energy absorbing member of markedly enhanced strength and/or impact energy absorption performance compared to the light metal by itself, and extremely practical structural materials are formed.

In the case of an aluminium/CFRP load bearing member where the light metal material is an aluminium section, the thickness of the CFRP is preferably at least ⅟₅₀ and up to ½. This is because within this range the reinforcing effect is most efficiently manifested.

Furthermore, it is preferred that the carbon fibre be a PAN-based carbon fibre of elastic modulus 200 to 500 GPa and tensile strength 2.2 GPa to 10 GPa. It is further preferred that the tensile strength be 3 GPa to 8 GPa. The carbon fibre is primarily arranged in the direction where rigidity of the aluminium material is required, for example in the lengthwise direction of the section (within an angle of ±15° to the lengthwise axis). In the case where there is included fibre other than carbon fibre (glass fibre, aramid fibre, synthetic fibre or the like), it is preferred that the amount of this reinforcing fibre other than carbon fibre be less than the weight of the carbon fibre in order that the high stiffness of the carbon fibre is not impaired.

The rigidity/strength of the structural material increases the greater the proportion of carbon fibre arranged in the lengthwise direction, and taking into consideration a balance between the weight-reducing effect, the rigidity/strength enhancing effect, the creep properties and cost, it is preferred that the volume content of carbon fibre arranged in the lengthwise direction as a proportion of the reinforcing fibre be from 5 to 50%.

Furthermore, when designing taking cost into consideration, the CFRP may also be present in the lengthwise direction in parts. In order to enhance the strength and rigidity most efficiently, the CFRP layer is preferably disposed at the surface of the section material, but it may also be disposed in the vicinity of the surface from the point of view of design convenience or operational characteristics.

Now, in the case where the CFRP portion is present in parts (unevenly distributed), the adhesive agent is preferably of the cold curing type. This is not just because of the galvanic corrosion prevention effect but also because it is possible to reduce warping of the section material at those places where the CFRP is unevenly distributed, caused by the shrinkage at the time of cooling which occurs with a hot curing type adhesive.

Symmetrical arrangement of the CFRP and light metal material is also a method for eliminating apparent warping, but if adhesion is carried out at room temperature then an outstanding structural material can be formed more economically without using unnecessary materials.

Figure 5:
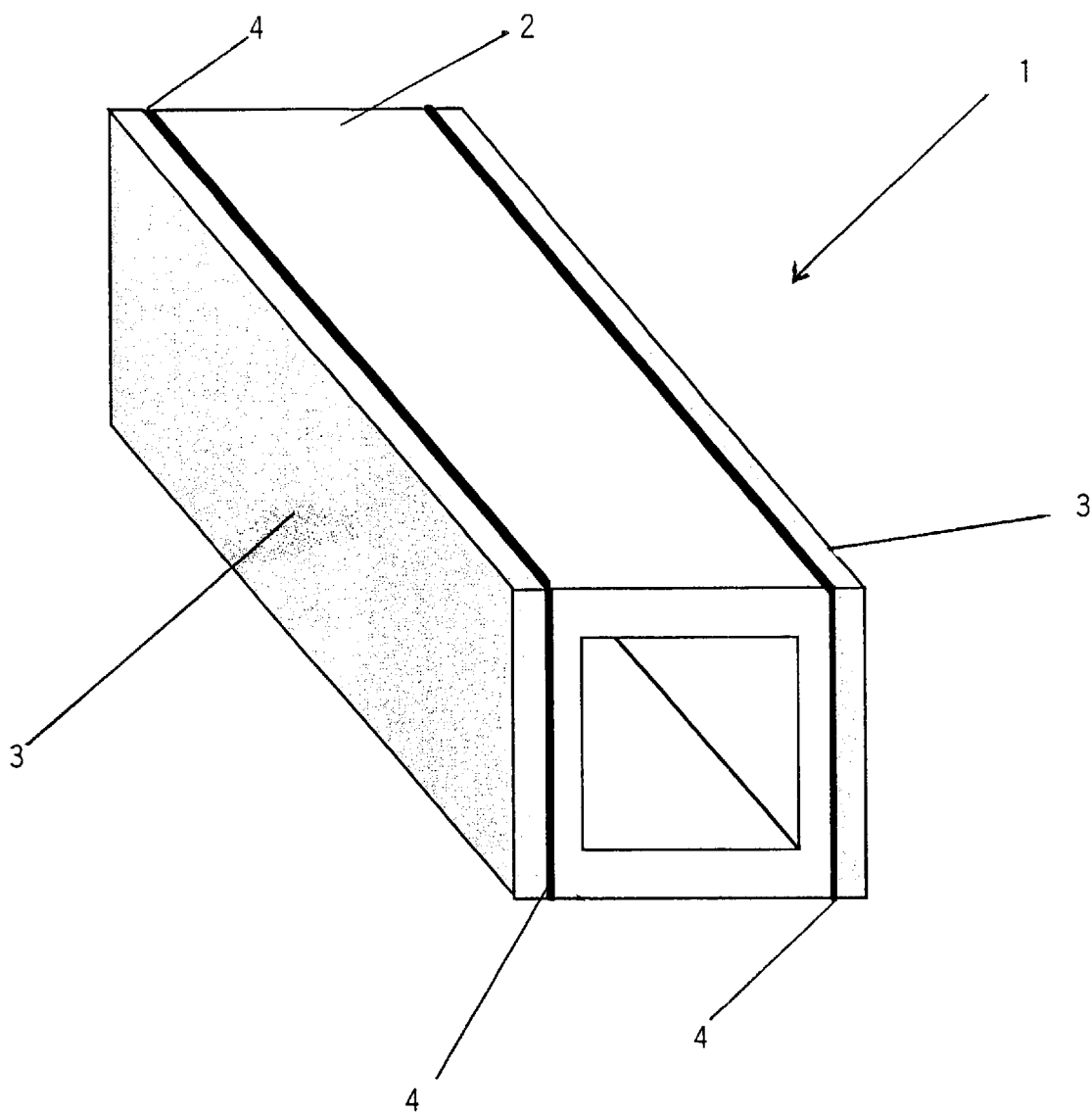
FIG. 5 is a schematic diagram of a hollow square-shaped impact absorbing member relating to a practical embodiment of the present invention.
Figure 6:
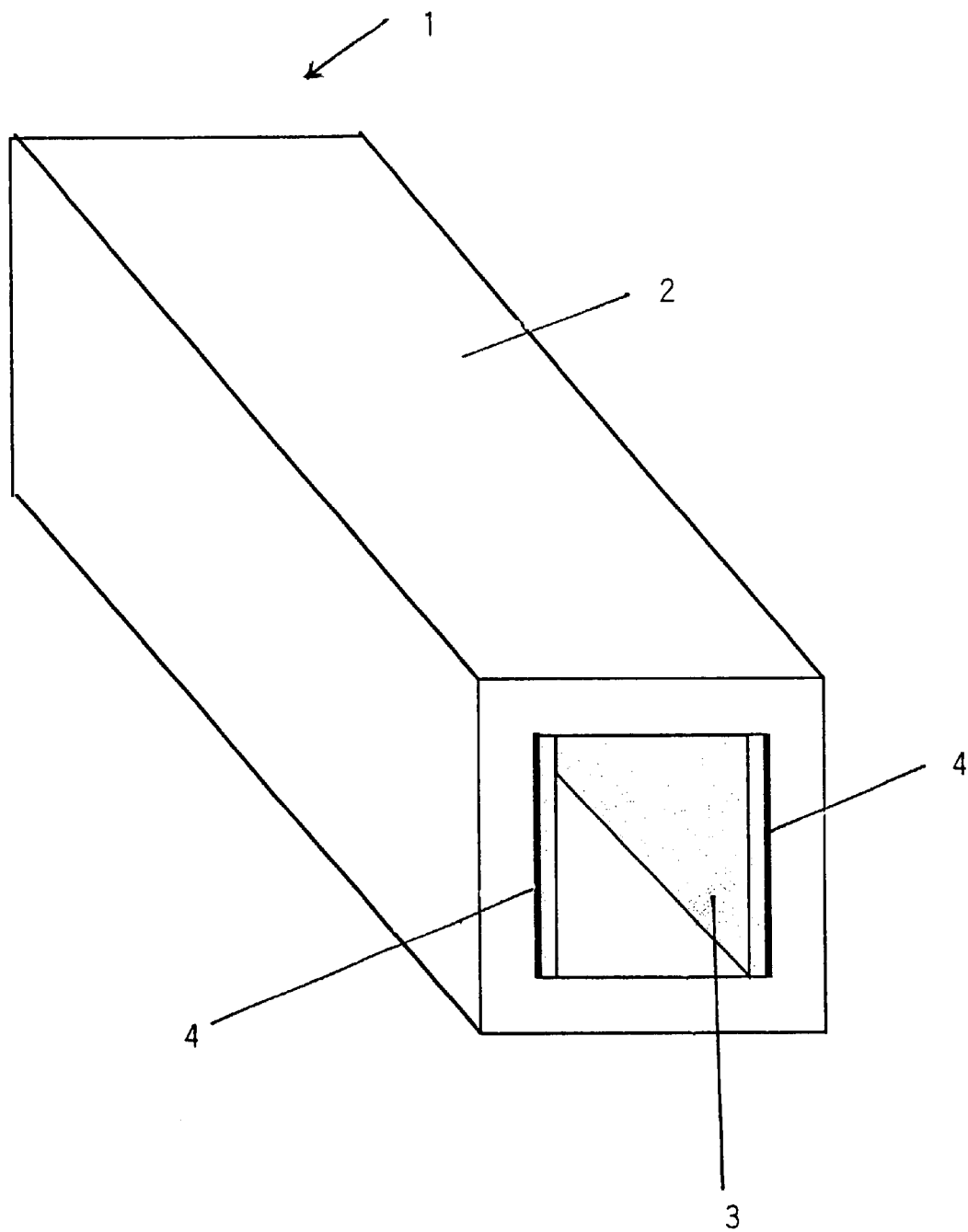
FIG. 6 is a schematic diagram of another hollow square-shaped impact absorbing member relating to a practical embodiment of the present invention.

On the other hand, in the case of an impact energy absorbing member comprising an aluminium section and CFRP, and where the light metal is an aluminium alloy, the thickness of the CFRP is preferably from 1/100 up to 1/3. Within this range the reinforcing efficiency is optimal in economic terms. Moreover, the light metal material is preferably a hollow section (FIG. 5, FIG. 6).

Again, with regard to the aforesaid CFRP employing carbon fibre and/or reinforcing fibre other than this, it is preferred that the elastic modulus be 100–500 GPa, which is higher than that of aluminium. The carbon fibre employed as a reinforcing fibre to give a CFRP elastic modulus within this range is preferably carbon fibre with a good balance of strength and elastic modulus, where the elastic modulus is 200–500 GPa and the tensile elongation is at least 1.5% but no more than 3.5%, preferably at least 2.2% but no more than 3.5%.

Again, the tensile strength of the CFRP is important and it is preferably 1.0–10.0 GPa, which is a higher strength than that of aluminium. Furthermore, it is still further preferred that the tensile strength be from 2.5 GPa to 8 GPa.

This is because, within this range, it is possible to prevent the cracking of the aluminium which occurs at the time of impact. Cracks in the aluminium become locations for the incursion of rainwater and the like, and there is the possibility of this leading to failure of the structure as a whole or electrical system damage. Normally, following an impact, immediate replacement of the member is carried out, but with the member of the present invention there is no need for rapid replacement following impact and the replacement of the member may be carried out at a convenient time.

Now, the elastic modulus of the CFRP is essentially determined by the following formula.

elastic modulus of the CFRP = elestic modulus of the carbon fibre × volume content of the carbon fibre

The elastic modulus, elongation and strength of the CFRP can be measured in accordance with ASTM D3039.

Again, the thickness of the CFRP is preferably from 1/100 up to 1/3 in terms of the height of the aluminium or aluminium alloy section. This is because the reinforcing efficiency is optimal in economic terms within this range.

The carbon fibre is primarily arranged in the lengthwise direction of the section (within an angle of ±15° to the lengthwise axis), and fibre other than carbon fibre (glass fibre, aramid fibre, polyethylene fibre or the like) may also be included. It is preferred that the amount of the reinforcing fibre other than carbon fibre be less than the weight of the carbon fibre in order that the high stiffness of the carbon fibre is not impaired.

Figure 7:
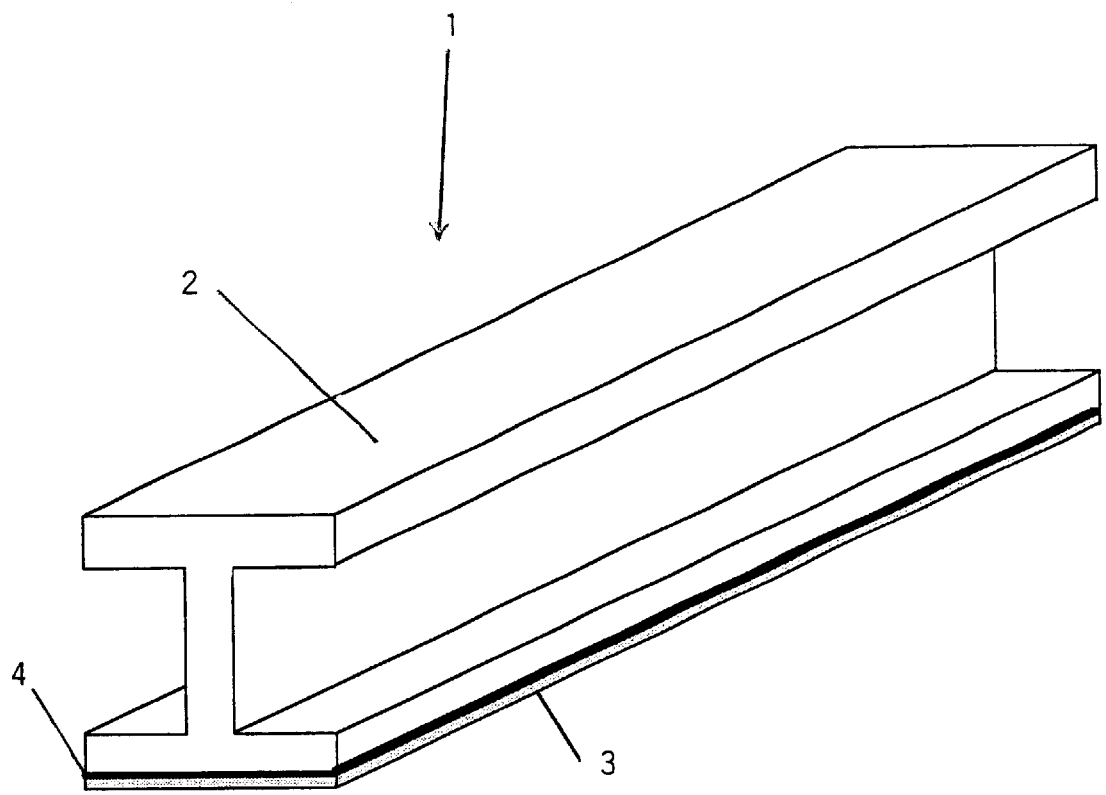
FIG. 7 is a schematic diagram of an impact absorbing member with an I-shape cross-section relating to a practical embodiment of the present invention.

Again, in the case of an impact energy absorbing member, when designing taking economics into consideration the CFRP material may be present in parts in the lengthwise direction (FIG. 7).

Moreover, in the same way as galvanic corrosion, in order than the impact characteristics be efficiently manifested, it is preferred that the adhesive strength (tensile shear strength) be from 15 MPa to 50 MPa.

If the adhesive strength lies below this range, the stresses at the time of impact are not transmitted between the aluminium and the CFRP and there may not be a marked enhancement in the impact absorption energy. Conversely, if it lies above this range, then cracks produced within the aluminium or the CFRP are readily propagated over the entire cross-section, with the result that the impact absorption energy may not be markedly enhanced. More preferably, the adhesive strength is from 15 MPa to 35 MPa. Furthermore, in the case where control is effected by, for example, carrying out two or more different surface treatments so that the adhesive strength lies non-uniformly within the aforesaid range as discussed below, the adhesive strength will correspond to the average strength for the locations where adhesion is strong and where it is weak (this is referred to as the apparent average strength).

Now, the impact characteristics will be sufficiently high under the aforesaid conditions but, as a means for further enhancing the energy absorption performance by separation of CFRP and light metal (for example aluminium) at the time of impact, it is also extremely effective to make the adhesive strength of the aluminium and CFRP non-uniform.

Figure 10:
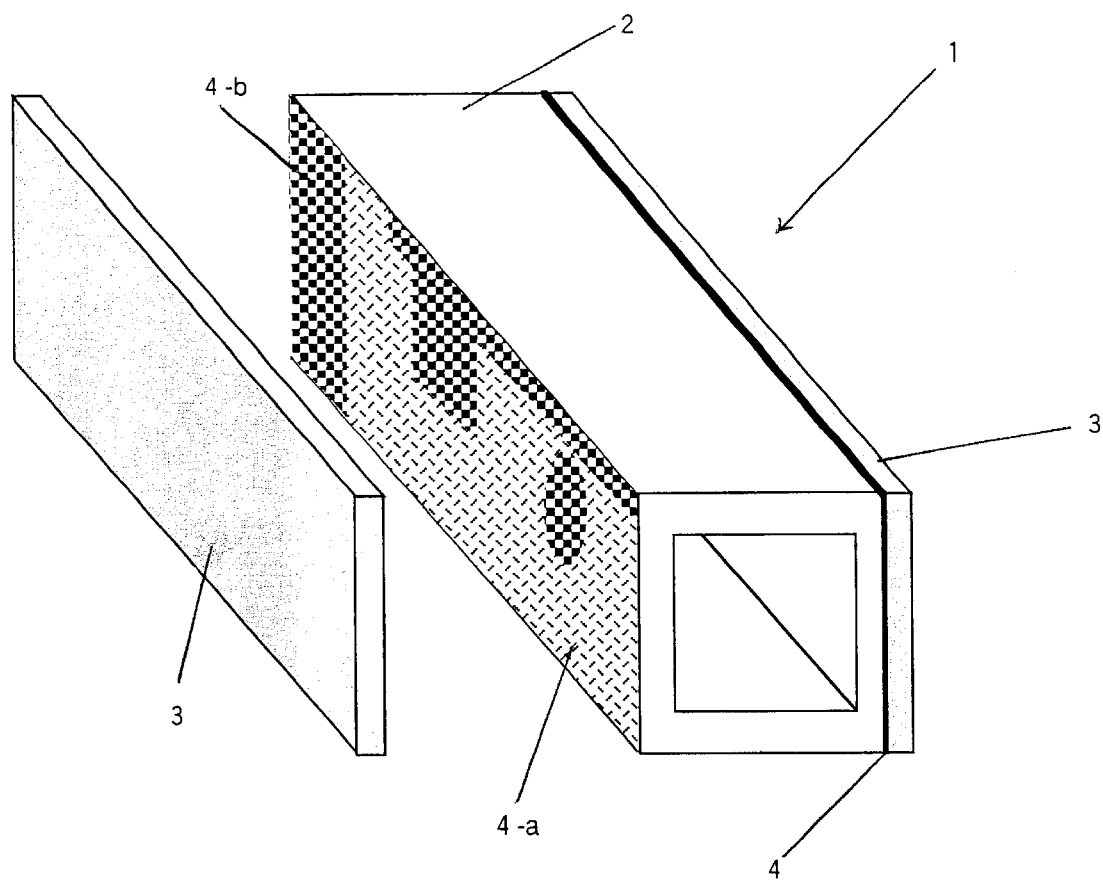
FIG. 10 is a diagram exemplifying a method of applying a plurality of adhesive agents in relation to a practical embodiment of the present invention.

That is to say, from amongst the aforesaid adhesive materials, if adhesion is performed using two or more types of adhesive agent with different adhesive strengths (FIG. 10), the adhesive strength is made non-uniform so, at the time of impact, separation occurs starting from those locations of low adhesion and progresses to those locations of high adhesion, and energy is absorbed due to the separation. Again, where there is separation, the propagation of cracks which is a cause of failure in repeated impact is prevented in those locations, so that performance is enhanced in terms of the resistance to repeated impact.

Instead of two or more types of adhesive agent, the aforesaid sandblasting or other such treatment of the aluminium, or the surface treatment of the CFRP surface, need not be carried out uniformly over the entire surface to be bonded and an uneven treatment may be conducted to produce regions of strong or weak adhesion. In such circumstances one type of adhesive agent will suffice instead of two or more types.

Now, the locations of strong and weak adhesion may be regularly distributed or they may be randomly distributed, but in terms of enhancing the reliability of the member it is more preferred that the distribution be regular. Specifically, the locations of strong adhesion or the locations of weak adhesion can be distributed in the form of a lattice, mesh, chequered pattern, stripes or spots. It is most preferred that the area ratio of the locations of strong and weak adhesion be roughly half and half.

For applying the adhesive, there can be used the aforesaid tools and there may also be employed a means whereby there is transferred adhesive which has already been applied to a film or the like. Again, by including glass fibre, organic fibre or other filler in the adhesive agent layer, it is possible to adjust the adhesive agent strength.

These may have any form such as short fibre form, woven material form, particle form, granular form, mesh form, film form, felt form or the like.

Merely in terms of the impact characteristics, it is preferred that the thickness of the adhesive agent layer be from 5 to 1500 $\mu$m but, taking into consideration the balance of galvanic corrosion and strength, the thickness is from 10 to 500 $\mu$m. This is because, if the thickness is less than 10 $\mu$m, there is the possibility of galvanic corrosion.

Figure 8:
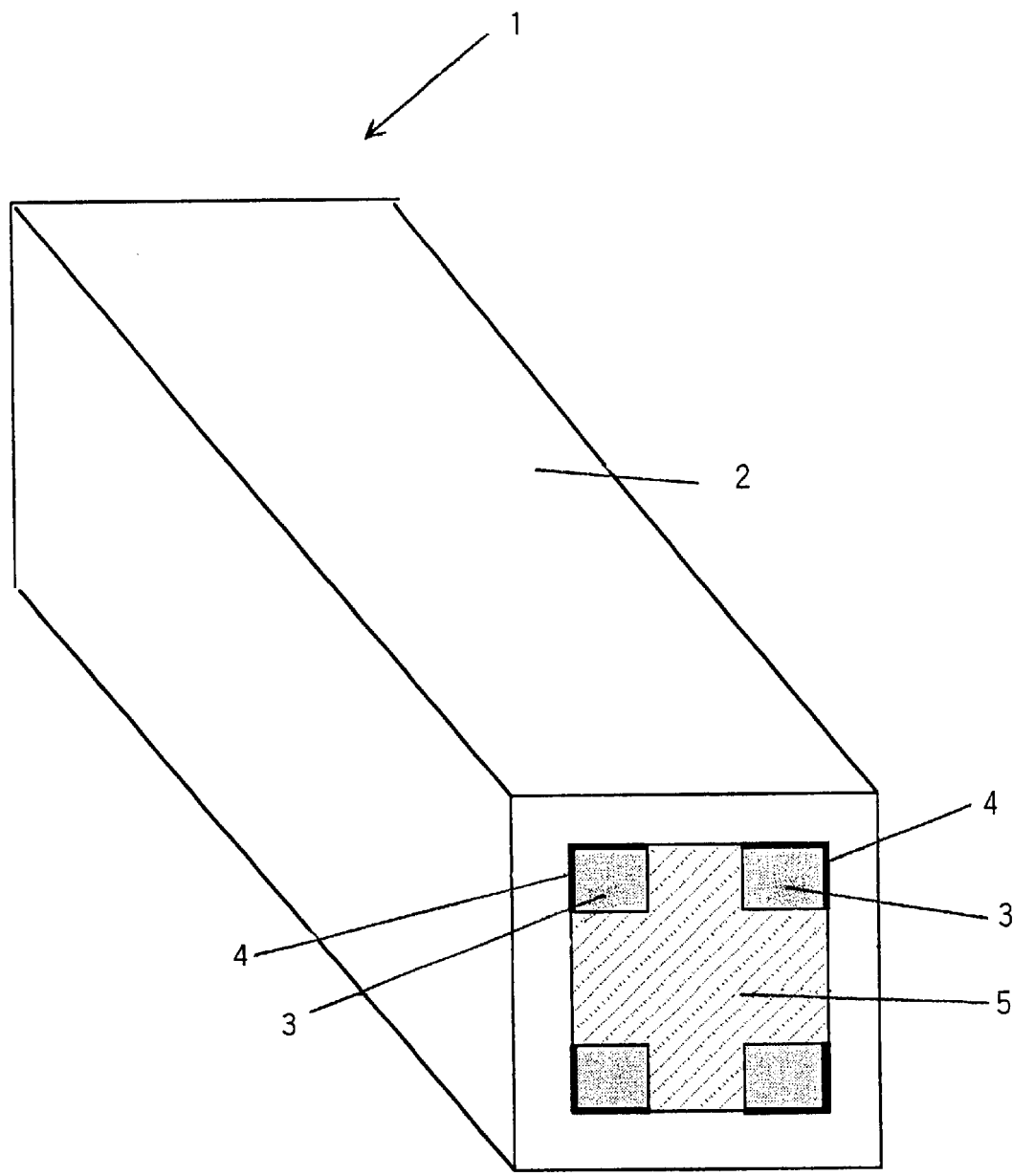
FIG. 8 is a schematic diagram of a foam-filled impact absorbing member relating to a practical embodiment of the present invention.

Now, the impact absorbing member is typically one where a part or all of the aluminium surface is covered with the CFRP material, but bonding may also be carried out in such a way that the CFRP material is inserted into a hollow portion or groove in the aluminium material (FIG. 8). Of course, the CFRP does not need to be arranged along the entire lengthwise direction of the aluminium section, and it may be affixed locally in those places where it is required to enhance the impact characteristics.

Furthermore, by filling the hollow portion with a foam material, rubber material or the like, it is possible to control the vibration characteristics and the penetration of moisture or dust caused by inflow of outside air.

Here, reference to a foam material includes expanded plastics with a cellular or sponge structure formed by adding a volatile or decomposing foaming agent to a polymer and blowing-in air, nitrogen, a reactive gas or the like, the foam rubbers containing minute bubbles employed as cushions and the like for seats in trains and cars, and foam glass of bulk density 0.1 to 0.6 which contains bubbles of carbon dioxide or the like.

Typical expanded plastics are those obtained by adding an inorganic foaming agent such as ammonium carbonate, ammonium bicarbonate, ammonium nitrite, sodium borohydride or an azide, or an organic foaming agent such as an azo compound, hydrazine compound, semicarbazide compound, triazole compound or N-nitroso compound to polyurethane, polystyrene, ABS resin, polyvinyl chloride, polyethylene, polypropylene, phenolic resin, urea resin, epoxy resin, silicone resin or cellulose acetate and performing chemical foaming by means of injection moulding, shape moulding, extrusion moulding, blow moulding, the Engel process or a vacuum moulding method, and by physical foaming by vaporization of a liquid.

Of these, polyurethane foam moulding and the foam moulding of phenols are characterized in that they can be carried out on the spot. In polyurethane foam moulding, moulding is carried out by mixing isocyanate with a mixture obtained by adding the foaming agent such as water, Freon or the like and a silicon-based surfactant to the polyol component.

In the foam moulding of phenols, the moulding can be carried out inside the mould utilizing the gas produced by the curing reaction. Phenolic foam materials are characterized in that their heat resistance and thermal insulation properties are excellent.

Now, there may also be added a foaming auxiliary such as dinitroso-pentamethylene-tetramine or the like to the foaming agent.

Again, the foam material also has the role of preventing the CFRP in the corner regions from falling away for any reason.

Moreover, there is no objection to providing a foam material, rubber material, coating material or the like on the outer surface of the impact absorbing member for the purposes of enhancing the design characteristics or the environmental resistance. Again, the impact absorbing member need not just be a rod shape, and it may have bends, or it may have holes or grooves for coupling and the like. In particular, in the case of a bumper reinforcing material, for reasons of external appearance, it is more effective to combine it with a cover made of a polymer such as urethane.

Moreover, in connecting the impact absorbing member of the present invention to some other member, mechanical connection can be carried out more effectively by setting screws in the light metal portion, and where the other member is a resin, connection can be carried out by the hot fusion bonding of the FRP resin portion. Of course, sticking together by means of an adhesive agent, or joining together using rivets, bolts or screws are also preferred methods of connection.

Now, in the case of the impact absorbing member of the present invention, by rounding the corner portions of the member it is possible to further enhance the impact absorption characteristics (FIG. 8). The corners are the angles of the polygon cross-section and if these regions are sharp then, at the time of impact, cracks may be generated from these corners. If cracks are generated from the corner regions then, along with the fact that the impact absorption performance may be reduced, the metal fracture surface produced by the cracks is sharp and undesirable in safety terms. Again, by rounding the corner regions, it is possible to suppress the generation of scratches produced by contact between members in the assembly stage, and so it is possible to ensure the impact absorption performance and design characteristics of the member. Moreover, by rounding the corners, the weight of the member is lowered and so there is economic merit.

In the rounding of the corner portions, while it will depend on the size of the member, if the radius is from 1 mm to 10 mm then the aforesaid cracks are not generated in terms of a normal impacting body, and this is effective.

Again, the CFRP need not necessarily be affixed only to the outer surface of the aluminium section and it may also be affixed to the inner surface. It may also be affixed to a part of the outer surface. By providing the CFRP at the inner surface or by providing it in parts, there is the feature that, in terms of appearance, it is possible to ensure that the surface has a metallic lustre.

Furthermore, the aluminium section is not restricted to a rectangular or square cross-section and it may of course have a round cross-section.

Finally, in the same way as ordinary structural materials, the structural material produced by bonding a light metal material and a CFRP via a layer of adhesive agent according to the present invention can be subjected machining such as drilling or cutting, for the purpose of connection or for altering the dimensions and the like.

In such circumstances, carbon fibre is exposed at the surface generated by the machining, so there is the possibility of galvanic corrosion due to the formation of an electrical circuit between the CF and the light metal by water droplets or the like. Moreover, even where machining is not carried out, because adhesive agent is not applied to the end faces of the CFRP sheet, there is the possibility of galvanic corrosion in cases where water droplets produce electrical short-circuiting between the CF and light metal.

Consequently, in the structures of the present invention, it is preferred that the surface of the CFRP be covered with an insulating material, in particular at the end faces where there is a considerable possibility of carbon fibre being exposed. This insulating material does not need to strongly bond the CFRP and light metal so, as well as an aforesaid adhesive agent, it may be a simple coating material, waterproofing material, oil, grease or the like. Typical coating materials are those of the epoxy, acrylic and urethane types.

It is also preferred that, at the machined faces following machining, a coating material, water-proofing material or oil be applied, or that filling with a sealant or caulking material be carried out so that there is no incursion of moisture.

Again, it is also preferred that the corrosion resistance be enhanced by forming an oxide layer on the light metal surface. As examples of specific treatments in the case of aluminium alloys, there is the provision of a 3 $\mu$m to 40 $\mu$m oxalic acid coating, ammonium borate coating, phosphoric acid coating or chromic acid coating.

EXAMPLES

The characteristics of the light metal/CFRP-made structural members of the present invention are now explained by means of practical examples. A summary of the conditions and results is given in Table 1 and Table 2.

Example 1

An epoxy resin matrix CFRP (carbon fibre volume content 60%, single fibre fineness 6.7×10$^{-5}$ g/m, thickness 150 $\mu$m) in which the reinforcing fibre was carbon fibre of tensile strength 3.5 GPa and elastic modulus 230 GPa was stuck to the upper and lower faces of an aluminium sheet (type 1050) of thickness 2 mm via a cold curing type epoxy resin of thickness 50 $\mu$m (volume resistivity 1×10$^{16}$ Ω.cm), and an aluminium/CFRP section of thickness 2.4 mm obtained (FIG. 1).

When this section was cut to a width of 25 mm, and subjected to a 3-point bending test at a 650 mm span, the strength was 1.6 GPa. Furthermore, the weight was 150 g/m.

Again, when this section was left for 5 years in a humidity-controlled chamber (temperature 23° C., relative humidity 55%), absolutely no galvanic corrosion was observed.

Furthermore, when this section was left outdoors, no galvanic corrosion was observed after 1 month. The volume resistivity of this adhesive agent when moisture had been absorbed was 2×10$^9$ Ω.cm. The adhesive strength at 23° C. was 20 MPa.

Comparative Example 1

An epoxy resin matrix CFRP (carbon fibre volume content 60%, single fibre fineness 6.6×10$^5$ g/m, thickness 150 $\mu$m) in which the reinforcing fibre was carbon fibre of tensile strength 1.8 GPa and elastic modulus 230 GPa was stuck to the upper and lower faces of an aluminium sheet (type 1050) of thickness 2 mm via a hot curing type epoxy resin (volume resistivity 4×10$^{13}$ Ω.cm), and an aluminium/CFRP section of thickness 2.3 mm obtained. The thickness of the adhesive agent in this section was 3 $\mu$m.

When this section was cut to a width of 25 mm, and subjected to a 3-point bending test in the same way as in Example 1, the strength was 0.9 GPa.

Again, when this section was left outdoors for 1 month in the same way as in Example 1, the aluminium and the CFRP separated due to galvanic corrosion.

The volume resistivity of this adhesive agent when moisture had been absorbed was 5×10$^9$ Ω.cm. The adhesive strength at 23° C. was 11 MPa.

Example 2

A 6063 aluminium alloy sheet of thickness 5 mm and a carbon fibre reinforced epoxy resin moulded sheet of thickness 1 mm (carbon fibre strength 4.9 GPa, carbon fibre elastic modulus 235 GPa, volume content of the carbon fibre 60%) were stuck together using a cold curing type epoxy resin adhesive agent to which 0.4 part of silane coupling agent had been added, at a layer thickness of 20 $\mu$m.

The volume resistivity of this adhesive agent measured based on JIS K6911 was 4×10$^{15}$ Ω.cm, and the volume resistivity when moisture had been absorbed (after leaving for 40 days in a constant temperature constant humidity tank at a temperature of 65° C. and relative humidity of 80%) was 5×10$^{13}$ Ω.cm. Right after curing, the adhesive strength at 23° C. and at 60° C. (test method, JIS K6850) was 18 MPa and 12 MPa respectively.

Subsequently,. after leaving in a constant temperature constant humidity tank at a temperature of 65° C. and relative humidity of 80% for 30 days, a check was made by eye for any separation and the adhesive strength measured at 23° C. No separation was observed and the adhesive strength was high, at 17 MPa.

Again, after further leaving in the constant temperature constant humidity tank at a temperature of 65° C. and relative humidity of 80% until the total time of leaving was 40 days, the adhesive strength in the moisture-absorbed state was measured at 23° C. The result was 14 MPa.

Example 3

Aluminium alloy sheet and carbon fibre reinforced epoxy resin moulded sheet identical to those in Example 2 were stuck together using a cold curing type epoxy resin adhesive agent containing silica particles and alumina powder (5 wt % and 3 wt % respectively), at a layer thickness of 50 $\mu$m. The secondary particle diameter of the silica particles was 30 $\mu$m and the particle diameter of the alumina powder was 30 $\mu$m.

When the volume resistivity of this bonded member was measured with or without having absorbed moisture based on JIS K6911 in the same way as in Example 2, the results were 5×10$^{14}$ Ω.cm and 3×10$^{10}$ Ω.cm respectively. Furthermore, right after curing the adhesive strength at 23° C. and at 60° C. (test method, JIS K6850) was 16 MPa and 10 MPa respectively.

Subsequently, in the same way as in Example 2, after leaving for 30 days in a constant temperature constant humidity tank at a temperature of 65° C. and relative humidity of 80%, a check was made by eye for any separation and the adhesive strength measured at 23° C. No separation was observed and the adhesive strength was 16 MPa. Again, after further leaving in the constant temperature constant humidity tank at a temperature of 65° C. and relative humidity of 80% until the total time of leaving was 40 days, the adhesive strength in the moisture-absorbed state was measured at 23° C. The result was 11 MPa.

Example 4

An aluminium alloy sheet/carbon fibre reinforced epoxy resin moulded sheet was obtained in exactly the same way as in Example 3 excepting that the thickness of the adhesive agent layer in Example 3 was adjusted to 100 µm.

When the volume resistivity of this bonded member was measured with or without having absorbed moisture based on JIS K6911 in the same way as in Example 3, the results were $5\times10^{14}$ Ω.cm and $3\times10^{10}$ Ω.cm respectively. Furthermore, right after hardening the adhesive strength at 23° C. and at 60° C. (test method, JIS K6850) was 15 MPa and 9 MPa respectively.

Subsequently, in the same way as in Example 3, after leaving for 30 days in a constant temperature constant humidity tank at a temperature of 65° C. and a relative humidity of 80%, a check was made by eye for any separation and the adhesive strength measured at 23° C. No separation was observed and the adhesive strength was 13 MPa. Again, after further leaving in the constant temperature constant humidity tank at a temperature of 65° C. and a relative humidity of 80% until the total time of leaving was 40 days, the adhesive strength in the moisture-absorbed state was measured at 23° C. The result was 10 MPa.

Example 5

Aluminium alloy sheet and carbon fibre reinforced epoxy resin moulded sheet identical to those in Example 2 were stuck together using a nylon-epoxy adhesive agent at a layer thickness of 300 µm. For control of the layer thickness, there was employed a spacer comprising three superimposed sheets of polyethylene film of thickness 100 µm.

When the volume resistivity of this bonded member was measured with or without having absorbed moisture based on JIS K6911 in the same way as in Example 2, the results were $2\times10^{13}$ Ω.cm and $4\times10^{9}$ Ω.cm respectively. Furthermore, right after curing the adhesive strength at 23° C. and at 60° C. (test method, JIS K6850) was 22 MPa and 10 MPa respectively.

Subsequently, in the same way as in Example 2, after leaving for 30 days in a constant temperature constant humidity tank at a temperature of 65° C. and a relative humidity of 80%, a check was made by eye for any separation and the adhesive strength measured at 23° C. No separation was observed and the adhesive strength was 18 MPa. Again, after further leaving in the constant temperature constant humidity tank at a temperature of 65° C. and a relative humidity of 80%, until the total time of leaving was 40 days, the adhesive strength when moisture had been absorbed was measured at 23° C. The result was 19 MPa.

Comparative Example 2

In the same way as in Example 2, 6063 aluminium alloy sheet of thickness 5 mm and carbon fibre reinforced epoxy resin moulded sheet of thickness 1 mm (carbon fibre strength 4.9 GPa, carbon fibre elastic modulus 235 GPa, volume content of the carbon fibre 60%) were stuck together using a cyanoacrylate type cold curing adhesive, at a layer thickness of 100 µm.

The volume resistivity of this adhesive agent measured based on JIS K6911 was $1\times10^{13}$ Ω.cm and the volume resistivity when moisture had been absorbed (after leaving for 40 days in a constant temperature constant humidity tank at a temperature of 65° C. and a relative humidity of 80%) was $7\times10^{11}$ Ω.cm. Right after curing, the adhesive strength at 23° C. and at 60° C. (test method JIS K6850) was 13 MPa and 9 MPa respectively.

Subsequently, after leaving in a constant temperature constant humidity tank at a temperature of 65° C. and a relative humidity of 80% for 30 days, a check was made by eye for any separation and the adhesive strength measured at 23° C. Separation was observed from the sheet edges and the aluminium in the region of separation had whitened. Furthermore, the adhesive strength had been considerably lowered, at 2 MPa.

Again, after further leaving in the constant temperature constant humidity tank at a temperature of 65° C. and a relative humidity of 80% until the total time of leaving was 40 days, the adhesive strength when moisture had been absorbed was measured at 23° C. The result was 0.9 MPa.

Comparative Example 3

In the same way as in Example 2, 6063 aluminium alloy sheet of thickness 5 mm and carbon fibre reinforced epoxy resin moulded sheet of thickness 1 mm (carbon fibre strength 4.9 GPa, carbon fibre elastic modulus 235 GPa, volume content of the carbon fibre 60%) were stuck together using 50 µm glass beads in an acrylic type cold curing adhesive, at a layer thickness of 50 µm.

The volume resistivity of this adhesive agent measured based on JIS K6911 was $9\times10^{14}$ Ω.cm and the volume resistivity when moisture had been absorbed (after leaving for 40 days in a constant temperature constant humidity tank at a temperature of 65° C. and a relative humidity of 80%) was $7\times10^{12}$ Ω.cm. Right after curing, the adhesive strength at 23° C. and at 60C (test method JIS K6850) was 7 MPa and 4 MPa respectively.

Subsequently, after leaving in a constant temperature constant humidity tank at a temperature of 65° C. and a relative humidity of 80% for 30 days, a check was made by eye for any separation and the adhesive strength measured at 23° C. There was separation over almost the entire surface and, in the same way as in Comparative Example 2, the aluminium in the region of separation had whitened. Furthermore, the adhesive strength had fallen considerably, at 0.3 MPa.

Again, it was further left in the constant temperature constant humidity tank at a temperature of 65° C. and a relative humidity of 80% until the total time of leaving was 40 days, but the aluminium and CFRP separated and it was not possible to carry out an adhesive strength test.

Comparative Example 4

In the same way as in Example 2, 6063 aluminium alloy sheet of thickness 5 mm and carbon fibre reinforced epoxy resin moulded sheet of thickness 1 mm (carbon fibre strength 4.9 GPa, carbon fibre elastic modulus 235 GPa, volume content of the carbon fibre 60%) were stuck together using a urethane type cold curing adhesive at a layer thickness of 150 µm.

The volume resistivity of this adhesive agent measured based on JIS K6911 was $5\times10^{12}$ Ω.cm and the volume resistivity when moisture had been absorbed (after leaving for 40 days in a constant temperature constant humidity tank at a temperature of 65° C. and a relative humidity of 80%) was $9\times10^{7}$ Ω.cm. Right after curing, the adhesive strength at 23° C. and at 60° C. (test method JIS K6850) was 17 MPa and 11 MPa respectively.

Subsequently, after leaving in a constant temperature constant humidity tank at a temperature of 65° C. and a relative humidity of 80% for 30 days, a check was made by eye for any separation and the adhesive strength measured at 23° C. Separation had begun from the edges and the adhesive strength had fallen to 10 MPa.

Again, after further leaving in the constant temperature constant humidity tank at a temperature of 65° C. and a relative humidity of 80% until the total time of leaving was 40 days, the adhesive strength when moisture had been absorbed was measured at 23° C. The result was 4 MPa.

Comparative Example 5

Using aluminium alloy sheet, carbon fibre reinforced epoxy resin moulded sheet and adhesive agent identical to those in Example 5, an aluminium/CFRP member was obtained by performing adhesion at a layer thickness of 5 μm by applying pressure with a press.

In the same way as in Example 5, when the volume resistivity for this bonded member was measured with or without moisture having been absorbed, the results were $3 \times 10^{13}$ Ω.cm and $9 \times 10^{9}$ Ω.cm respectively. Furthermore, right after curing the adhesive strength at 23° C. and at 60° C. was 19 MPa and 10 MPa respectively.

Subsequently, in the same way as in Example 2, after leaving in a constant temperature constant humidity tank at a temperature of 65° C. and a relative humidity of 80% for 30 days, a check was made by eye for any separation and the adhesive strength measured at 23° C. Separation had occurred over about 0.5 mm from the edges and the adhesive strength was lowered to 18 MPa. Again, after further leaving in the constant temperature constant humidity tank at a temperature of 65° C. and a relative humidity of 80% until the total time of leaving was 40 days, the adhesive strength when moisture had been absorbed was measured at 23° C. The result was 12 MPa.

Example 6

Using an identical adhesive agent to that in Example 5, 6063 aluminium alloy sheet of thickness 5 mm, on the surface of which had been formed an oxide layer of thickness 20 μm by an anodizing treatment in an electrolyte of 3% oxalic acid concentration, and a carbon fibre reinforced epoxy resin moulded sheet of thickness 1 mm (strength of carbon fibre 4.9 GPa, elastic modulus of the carbon fibre 235 GPa, and volume content of the carbon fibre 60%) were stuck together at a layer thickness of 10 μm.

In the same way as in Example 5, when the volume resistivity for this bonded member was measured with or without moisture having been absorbed, the results were $3 \times 10^{13}$ Ω.cm and $9 \times 10^{9}$ Ω.cm respectively. Furthermore, right after curing the adhesive strength at 23° C. and at 60° C. was 19 MPa and 10 MPa respectively.

Subsequently, in the same way as in Example 2, after leaving in a constant temperature constant humidity tank at a temperature of 65° C. and a relative humidity of 80% for 30 days a check was made by eye for any separation and the adhesive strength measured at 23° C. There was no separation and adhesive strength was unchanged at 19 MPa.

Again, after further leaving in the constant temperature constant humidity tank at a temperature of 65° C. and a relative humidity of 80% until the total time of leaving was 40 days, the adhesive strength when moisture had been absorbed was measured at 23° C, but there was no change and the result was 19 MPa.

Comparative Example 6

When a bending test was carried out at a span of 650 mm in the same way as in Example 1 with just aluminium sheet (type 1050) of thickness 2.4 mm and width 25 mm identical to that used in Example 1, the strength was 0.1 GPa.

Example 7

A phenolic resin matrix CFRP (carbon fibre volume content 60%, single fibre fineness $6.7 \times 10^{-5}$ g/m, thickness 150 μm) in which the reinforcing fibre was carbon fibre of tensile strength 4.9 GPa and elastic modulus 235 GPa was stuck to the lower face of a 25 mm×25 mm aluminium (type 6063) square material (-shaped material) of wall thickness 2 mm at room temperature using a phenolic adhesive agent (volume resistivity $5 \times 10^{16}$ Ω.cm) (thickness of adhesive layer=100 μm).

When this section was subjected to a three-point bending test at a span of 900 mm (arranged so that the CFRP surface was at the side stretched) at room temperature (25° C.) and at a high temperature (100° C.), the ratio of the strengths at room temperature and at high temperature was 0.9. Furthermore, when this section was left outdoors for a month, no separation due to galvanic corrosion was seen.

Now, the volume resistivity of this adhesive agent when moisture was absorbed was $5 \times 10^{10}$ Ω.cm. The adhesive strength at 23° C. was 19 MPa.

Example 8

To the upper and lower two faces of an extruded square-shaped hollow aluminium section (6063 type) of sides 10 mm, thickness 1 mm and length 120 mm, there was affixed unidirectional carbon fibre reinforced epoxy resin sheet of thickness 0.26 mm, tensile strength 2.5 GPa and elastic modulus 135 GPa with the fibre direction running lengthwise, using a cold curing type epoxy adhesive agent (FIG. 5). This unidirectional carbon fibre reinforced epoxy resin sheet was obtained by the pultrusion of carbon fibre strands of elastic modulus 230 GPa, strength 4.9 GPa and elongation of 2.1% in which there were 24000 fibres. The carbon fibre volume content was 60%, The adhesion faces of the aluminium were abraded by particle size #100 sand blasting and then degreased with acetone. The surface of the CFRP was abraded by hand with #1000 sandpaper, after which the surface was cleaned with MEK (methyl ethyl ketone). Furthermore, the thickness of the adhesive layer was 120 μm.

Figure 11:
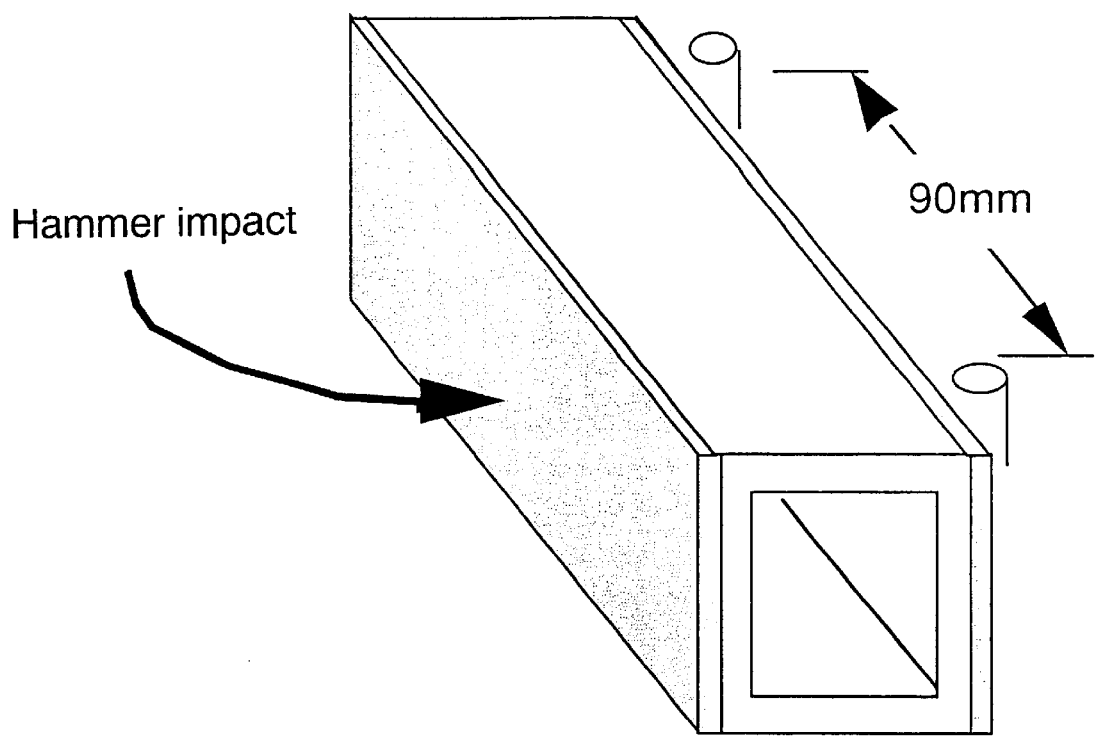
FIG. 11 is a schematic diagram of the Charpy impact test method relating to a practical embodiment of the present invention.

This hybrid material was subject to Charpy impact testing (FIG. 11) with the impact face and that on the opposite side being the CFRP faces. The span was 90 mm and the rate of impact was 3.7 m/s, As a result the impact absorption energy was 31 J.

Now, the adhesive strength (tensile shear strength) of the aforesaid aluminium and CFRP, based on JIS K6850, was 20 MPa. Furthermore, the volume resistivity of the adhesive was $6 \times 10^{15}$ Ω.cm, and the volume resistivity when moisture had been absorbed was $3 \times 10^{10}$ Ω.cm.

This impact absorbing member was left in a constant temperature constant humidity tank at a temperature of 65° C. and a relative humidity of 80% for 40 days, after which a check was made by eye for any separation and the adhesive strength was measured at 23° C. No separation was observed and adhesive strength was unchanged at 20 MPa. Again, when a Charpy test was carried out under the same conditions as above after leaving in this way, the impact absorption energy was 30 J. Moreover, no cracks had been generated in the aluminium portion following the impact test.

Comparative Example 7

When a Charpy test was carried out under the same conditions as in Example 8 (span 90 mm, rate of impact 3.7 m/s) on just the extruded square-shaped hollow aluminium section (6063 type) of sides 10 mm, thickness 1 mm and length 120 mm employed in Example 8, the impact absorption energy was 10 J. Now, cracks had been generated in the aluminium section following the impact testing.

Example 9

When a Charpy test was carried out under the same conditions as in Example 8 except that there was employed in Example 8 CFRP of elastic modulus 70 GPa and strength 0.5 GPa, the impact absorption energy was 13 J. Following the impact testing, cracks had been produced in the aluminium portion.

Example 10

When a Charpy test was carried out in the same way as in Example 8 except that the thickness of the CFRP in Example 8 was made 0.13 mm at the side receiving the impact and 0.19 mm at the side opposite that receiving the impact, the impact absorption energy was 19 J. Following the impact test, cracks had been produced in the aluminium portion.

Example 11

When a Charpy test was carried out in the same way as in Example 8 except that the CFRP was stuck to the corresponding inner faces instead of the outer faces of the aluminium in Example 8 (FIG. 6), the impact absorption energy was 23 J. Following the impact test, cracks had been produced in the aluminium portion.

Example 12

When a Charpy test was carried out in the same way as in Example 8 except that the thickness of the CFRP in Example 8 was 0.25 mm, the tensile strength was 2.2 GPa and the tensile elastic modulus was 250 GPa, the impact absorption energy was 33 J. Following the impact test, no cracks had been produced in the aluminium portion.

Example 13

When a Charpy test was carried out in the same way as in Example 8 except that a 2 mm×2 mm CFRP square rod was stuck to the four corners on the aluminium interior in Example 8, the impact absorption energy was 27 J. Following the impact test, slight crack formation had occurred in the aluminium portion.

Example 14

When a Charpy test was carried out in the same way as in Example 13, excepting that the sample interior in Example 13 was filled with polystyrene foam (FIG. 8), the impact absorption energy was 27 J. Following the impact test, slight crack formation had occurred in the aluminium portion.

Comparative Example 8

When a Charpy test was carried out in the same way as in Example 14 on a sample with the CFRP in Example 14 removed (with the aluminium interior filled with polystyrene foam), the impact absorption energy was 8 J. Following the impact test, cracks had been produced in the aluminium section.

Example 15

Figure 12:
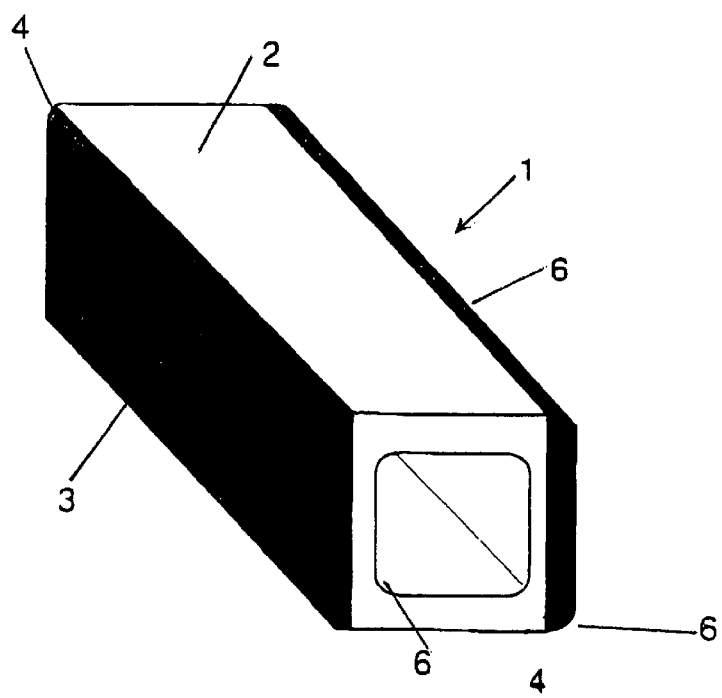
FIG. 12 is a schematic diagram of an impact absorbing member having rounded corners in relation to a practical embodiment of the present invention.

When a Charpy test was carried out in the same way as in Example 13 excepting that the four corners on the outside of the aluminium material in Example 13 were rounded and given a radius of 1.0 mm (FIG. 12), the impact absorption energy was 30 J. Following impact, there were no cracks in the aluminium portion.

Example 16

When a Charpy test was carried out in the same way as in Example 8 excepting that adhesion was carried out using phenolic adhesive agent A and epoxy adhesive agent B as the adhesive agent in Example 8, with A and B being applied alternately in 10 mm widths, and the thickness of the adhesive agent layer being 150 $\mu$m, the impact absorption energy was 33 J.

The tensile shear adhesive strengths, based on JIS K6850, of aforesaid phenolic adhesive agent A and epoxy adhesive agent B were respectively 15 MPa and 23 MPa, while the tensile shear adhesive strength with A and B applied in equal widths was 20 MPa. Furthermore, the volume resistivity of the phenolic adhesive agent A was $2 \times 10^{15}$ $\Omega$.cm, while the volume resistivity when moisture had been absorbed was $2 \times 10^{11}$ $\Omega$.cm; the volume resistivity of the epoxy adhesive agent B was $5 \times 10^{14}$ $\Omega$.cm while the volume resistivity when moisture had been absorbed was $2 \times 10^{10}$ $\Omega$.cm; and volume resistivity in the case where adhesive agent A and adhesive agent B were applied in equal 10 mm widths was $7 \times 10^{14}$ $\Omega$.cm, while the volume resistivity when moisture had been absorbed was $8 \times 10^{10}$ $\Omega$.cm.

This impact absorbing member was left in a constant temperature constant humidity tank at a temperature of 65° C. and a relative humidity of 80% for 30 days, after which a check was made by eye for any separation and the adhesive strength measured at 23° C. No separation was observed and the adhesive strength was unchanged at 20 MPa. Again, when a Charpy test was carried out under the same conditions as above after leaving in this way, the impact absorption energy was 33 J. There were no cracks in the aluminium portion following the impact.

Example 17

When a Charpy test was carried out in the same way as in Example 16 excepting that the phenolic adhesive agent A in Example 16 was applied in the form of spots (the spots were of diameter 5 mm, with the distance between the centres 20 mm), and the epoxy adhesive agent B was applied therebetween, with the thickness of the adhesive agent layer being 200 $\mu$m, the impact absorption energy was 33 J.

The tensile shear strength in the case where A was applied in the form of spots and B applied around these, in the same way as above, was 22 MPa, the volume resistivity was $6 \times 10^{14}$ $\Omega$.cm and the volume resistivity when moisture had been absorbed was $7 \times 10^{10}$ gcm.

This impact absorbing member was left in a constant temperature constant humidity tank at a temperature of 65° C. and a relative humidity of 80% for 30 days, after which a check was made by eye for any separation and the adhesive strength measured at 23° C. No separation was observed and the adhesive strength was unchanged at 22 MPa. Again, when a Charpy test was carried out under the same conditions as above after leaving in this way, the impact absorption energy was 33 J. There were no cracks in the aluminium portion following the impact.

Example 18

When a Charpy test was carried out in the same way as in Example 8 excepting that a sheet of glass cloth (plain weave, weight per unit area of fibre 20 g/m$^2$) was inserted into the epoxy adhesive agent in Example 8, the impact absorption energy was 32 J.

Furthermore, the thickness of the aforesaid glass cloth was 20 $\mu$m, the thickness of the adhesive agent layer was 25 $\mu$m, the volume resistivity of the adhesive agent layer including this glass cloth was $1 \times 10^{15}$ $\Omega$.cm, the volume resistivity when moisture had been absorbed was $8 \times 10^{11}$ $\Omega$.cm, and the tensile strength was 18 MPa.

This impact absorbing member was left in a constant temperature constant humidity tank at a temperature of 65° C. and a relative humidity of 80% for 30 days, after which a check was made by eye for any separation and the adhesive strength measured at 23° C. No separation was observed and the adhesive strength had increased to 20 MPa. Again, when a Charpy test was carried out under the same conditions as above after leaving in this way, the impact absorption energy was 33 J. There were no cracks in the aluminium portion following the impact.

Example 19

When a Charpy test was carried out in the same way as in Example 8 excepting that the CFRP was stuck to one side face of the aluminium in Example 8, and the CFRP face was made the opposite side to the side subject to impact, the impact absorption energy was 28 J.

In the same way as in Example 8, the thickness of the adhesive layer was 120 μm, the adhesive strength (tensile shear strength) based on JIS K6850 was 20 MPa, the volume resistivity of the adhesive agent was $6 \times 10^{15}$ Ω.cm, and the volume resistivity when moisture had been absorbed was $3 \times 10^{10}$ Ω.cm.

This impact absorbing member was left in a constant temperature constant humidity tank at a temperature of 65° C. and a relative humidity of 80% for 40 days, after which a check was made by eye for any separation and the adhesive strength measured at 23° C. No separation was observed and the adhesive strength was unchanged at 20 MPa. Again, when a Charpy test was carried out under the same conditions as above after leaving in this way, the impact absorption energy was 28 J. There were no cracks in the aluminium portion following impact.

Example 20

Figure 9:
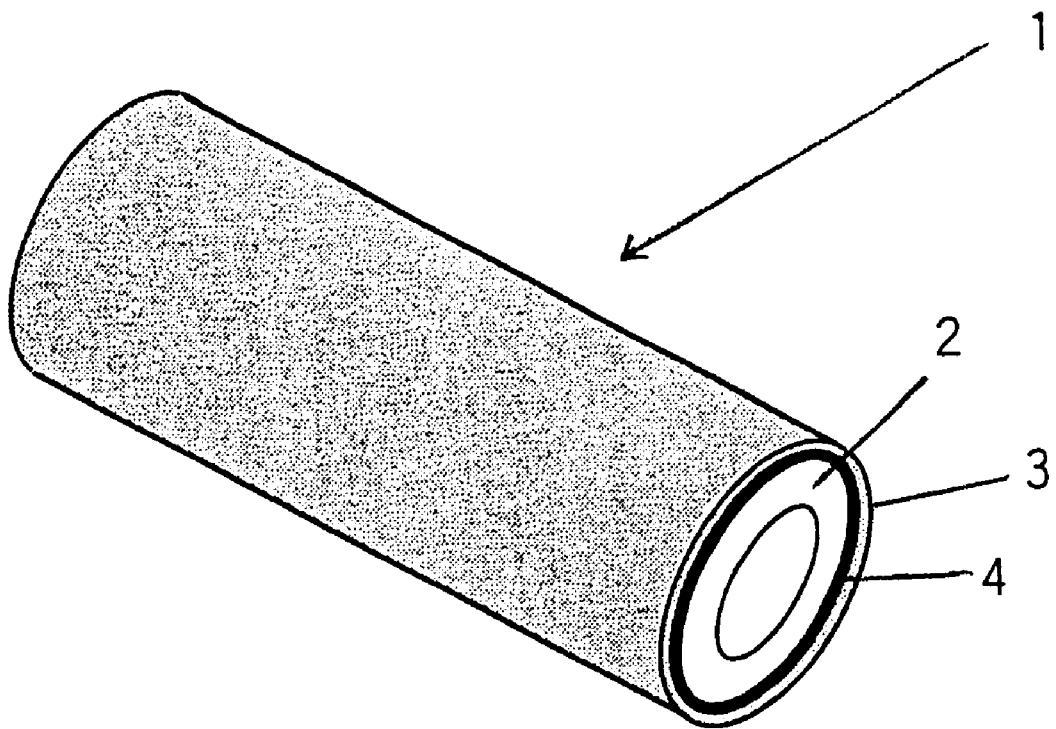
FIG. 9 is a schematic diagram of round pipe shaped impact absorbing member relating to a practical embodiment of the present invention.

A nylon-epoxy type adhesive agent was applied around the outside of a round aluminium pipe (made of 1050 pure aluminium, diameter 15 mm and wall thickness 1 mm) and tentatively hardened at a layer thickness of 300 μm, after which a carbon fibre prepreg (epoxy resin matrix, weight per unit area of fibre 150 g/m², thickness 140 μm) was wound round the outside twice in such a way that the fibre direction was in the pipe lengthwise direction and adhesion/curing then performed to produce a hybrid pipe (FIG. 9). When this was subjected to Charpy impact testing under the same test conditions as in Example 8 (span 90 mm, rate of impact 3.7 m/s), the impact absorption energy was 22 J.

This impact absorbing member was left in a constant temperature constant humidity tank at a temperature of 65° C. and a relative humidity of 80% for 40 days, after which a check was made by eye for any separation and the adhesive strength measured at 23° C. No separation was observed. Again, when a Charpy test was carried out under the same conditions as above after leaving in this way, the impact absorption energy was 21 J.

Comparative Example 9

When a Charpy test was carried out under the same conditions as in Example 20 on just the round aluminium pipe used in Example 20 (made of 1050 pure aluminium, diameter 15 mm, wall thickness 1 mm), the impact absorption energy was 12 J.

Example 21

When a Charpy test was carried out under the same conditions as in Example 20 on a hybrid pipe formed with the direction of wrapping the prepreg in Example 20 in the lengthwise direction for 1 wrap and with the fibre arrangement direction in the pipe circumferential direction for the second wrap, the impact absorption energy was 29 J.

This impact absorbing member was left in a constant temperature constant humidity tank at a temperature of 65° C. and a relative humidity of 80% for 40 days, after which a check was made by eye for any separation and the adhesive strength measured at 23° C. No separation was observed. Again, when a Charpy test was carried out under the same conditions as above after leaving in this way, the impact absorption energy was 27 J.

Comparative Example 10

A square-shaped hollow CFRP section of sides 10 mm, thickness 1 mm and length 120 mm (carbon fibre volume content 60%, CFRP tensile strength 2.5 GPa, elastic modulus 135 GPa, and with the carbon fibre strands arranged in the lengthwise direction) was obtained by the unidirectional pultrusion of the carbon fibre strands with 24000 fibres, of elastic modulus 230 GPa, strength 4.9 GPa and elongation 2.1%, employed in Example 8. This unidirectional carbon fibre reinforced plastic sheet was subjected to Charpy impact testing under the same conditions as in Example 8. The span was 90 mm and the rate of impact was 3.7 m/s. As a result the CFR separated into two and the impact absorption energy was 6 J.

Example 22

To the upper and lower faces of an extruded square-shaped hollow aluminium section (6063 type) of sides 10 mm, thickness 1 mm and length 120 mm there was affixed, with a cold curing type epoxy resin adhesive identical to that used in Example 8, a unidirectional carbon fibre reinforced epoxy resin sheet of thickness 0.25 mm, tensile strength 2.0 GPa and elastic modulus 270 GPa, such that the fibre direction was in the lengthwise direction. This unidirectional carbon fibre reinforced epoxy resin sheet was obtained by the pultrusion of carbon fibre strands with 6000 fibres, of elastic modulus 450 GPa, strength 3.5 GPa and elongation 0.8%. The volume content of carbon the fibre was 60%. The adhesion faces of the aluminium were abraded by particle size #100 sand blasting, after which degreasing was performed with acetone. The surface of the CFRP was abraded by hand with #1000 sandpaper, after which the surface was washed with MEK (methyl ethyl ketone). Furthermore, the thickness of the adhesive layer was 120 μm.

This hybrid material was subject to Charpy impact testing with the impact face and that on the opposite side being the CFRP faces. The span was 90 mm and the rate of impact was 3.7 mis, As a result the impact absorption energy was 13 J.

Now, the adhesive strength (tensile shear strength) of the aforesaid aluminium and CFRP, based on JIS K6850, was 20 MPa. Furthermore, the volume resistivity of the adhesive agent was $6 \times 10^{15}$ Ωcm, and the volume resistivity when moisture had been absorbed was $3 \times 10^{10}$ Ωcm.

This impact absorbing member was left in a constant temperature constant humidity tank at a temperature of 65° C. and a relative humidity of 80% for 40 days, after which a check was made by eye for any separation and the adhesive strength was measured at 23° C. No separation was observed and adhesive strength was unchanged at 20 MPa. Again, when a Charpy test was carried out under the same conditions as above after leaving in this way, the impact absorption energy was 13 J. Moreover, cracks were produced in the aluminium following impact.

INDUSTRIAL UTILIZATION POTENTIAL

In accordance with the present invention, since conventional light metal/CFRP structural materials can be made still lighter and, furthermore, since the resistance to galvanic corrosion is outstanding and it is possible to markedly enhance the strength and the impact energy absorption performance, development of applications and large-scale expansion into new fields becomes possible. In terms of environmental protection too, weight reduction and enhancing the durability and reliability of structures is an all-important technical issue for the future, and this technique offers one answer thereto, and thus makes a major contribution to society.

TABLE 1

| | Light Metal | | CFRP | | | | | Adhesive agent layer | |
|---|---|---|---|---|---|---|---|---|---|
| | | | CF[1] | | | | | | |
| | Al Material | thickness mm | section mm | tensile strength GPa | elastic modulus GPa | thickness (top/bottom) μm | adhesive strength[2] | thickness μm | Notes |
| Examples | | | | | | | | | |
| 1 | 1050 | 2 | sheet | 3.5 | 230 | 150/150 | Epoxy type | 50 | |
| 2 | 6063 | 5 | | 4.9 | 235 | 1000 | | 20 | |
| 3 | | | | | | | | 50 | |
| 4 | | | | | | | | 100 | |
| 5 | | | | | | | | 300 | |
| 6 | | | | | | | | 10 | oxalic acid treatment |
| 7 | 6063 | 2 | 25 × 25 hollow square | 4.9 | 235 | 150 | Phenolic type | 100 | Phenolic type resin matrix |
| 8 | | 1 | 10 × 10 hollow square | 4.9 | 230 | 260/260 | epoxy type | 120 | abrasion treatment |
| 9 | | | | (0.5) | (70) | | | | |
| 10 | | | | 4.9 | 230 | 130/190 | | | |
| 11 | | | | | | 260/260 | | | abrasion treatment inner surface laminated |
| 12 | | | | (2.2) | (250) | 250/250 | | | abrasion treatment |
| 13 | | | | 4.9 | 230 | (2 × 2) × 4 | | | 4 corners reinforced |
| 14 | | | | | | | | | 4 corner reinforced PS Form |
| 15 | | | | | | | | 250 | IR rounding |
| 16 | | | | | | 260/260 | Epoxy phenolic type | 150 | alternate adhesive agent application |
| 17 | | | | | | | | | |
| 18 | | | | | | | Epoxy type | 25 | glass cloth inserted |
| 19 | | | | | | /260 | | 120 | one face reinforced |
| 20 | 1050 | 1 | 15φ pipe | | | 150 g/m² × 2 | nylon epoxy type | 300 | 2 layers of cloth |
| 21 | | | | | | | | | direction of lamination changed |
| 22 | 6063 | 1 | 10 × 10 hollow square shaped material | 3.5 (2.0) | 450 (270) | 250/250 | Epoxy type | 120 | |
| Comp. examples | | | | | | | | | |
| 1 | 1050 | 2 | sheet | 1.8 | 230 | 150/150 | Epoxy type | 3 | |
| 2 | 6063 | 5 | | 4.9 | 235 | 1000 | Cyanoacrylate type | 100 | |
| 3 | | | | | | | Acrylic type | 50 | |
| 4 | | | | | | | Urethane type | 150 | |
| 5 | | | | | | | Epoxy type | 5 | |
| 6 | 1050 | 2.4 | | | | | | | aluminium alone |
| 7 | 6063 | 1 | | | | | | | |
| 8 | | | 10 × 10 hollow square shaped material | | | | | | PS Foam filled |
| 9 | 1050 | | 15φ pipe | | | | | | aluminium alone |
| 10 | — | | | 4.9 | 235 | 1000 | — | | CFRP alone |

[1] Figures in brackets shows the FRP strength or modulus
[2] The CFRP matrix resin is epoxy in each case except Example 7

TABLE 2

| | Volume resistivity when no moisture absorbed (Ω · cm) | Volume resistivity when moisture has been absorbed (Ω · cm) | Adhesive strength (MPa) | | | Bending strength (GPa) | Ratio of bending strengths 100° C./ 25° C. | Impact absorption energy (J) | Impact absorption energy when moisture absorbed (J) | Whether or not separation occurs[1] | Whether or not cracking occurs |
|---|---|---|---|---|---|---|---|---|---|---|---|
| | | | Room temperature | When moisture has been absorbed | 60° C. After leaving | | | | | | |
| Examples | | | | | | | | | | | |
| 1 | 1 × 10¹⁶ | 2 × 10⁹ | 20 | | | 1.6 | | | | No[2] | |

TABLE 2-continued

| | Volume resistivity when no moisture absorbed (Ω·cm) | Volume resistivity when moisture has been absorbed (Ω·cm) | Adhesive strength (MPa) | | | | Bending strength (GPa) | Ratio of bending strengths 100° C./ 25° C. | Impact absorption energy (J) | Impact absorption energy when moisture absorbed (J) | Whether or not separation occurs[1] | Whether or not cracking occurs |
|---|---|---|---|---|---|---|---|---|---|---|---|---|
| | | | Room temperature | When moisture has been absorbed | 60° C. | After leaving | | | | | | |
| 2 | 4 × 10¹⁵ | 5 × 10¹³ | 18 | 14 | 12 | 17 | | | | | No | |
| 3 | 5 × 10¹⁴ | 3 × 10¹⁰ | 16 | 11 | 10 | 16 | | | | | | |
| 4 | 5 × 10¹⁴ | 3 × 10¹⁰ | 15 | 10 | 9 | 13 | | | | | | |
| 5 | 2 × 10¹³ | 4 × 10⁹ | 22 | 19 | 10 | 18 | | | | | | |
| 6 | 3 × 10¹³ | 9 × 10⁹ | 19 | 19 | 10 | 19 | | | | | | |
| 7 | 5 × 10¹⁶ | 5 × 10¹⁰ | 19 | | | | | 0.9 | | | | |
| 8 | 6 × 10¹⁵ | 3 × 10¹⁰ | 20 | | | 20 | | | 31 | 30 | No | No |
| 9 | | (3 × 10¹⁰) | (20) | | | (20) | | | 13 | — | | Yes |
| 10 | | | | | | | | | 19 | | | |
| 11 | | | | | | | | | 23 | | | |
| 12 | | | | | | | | | 33 | | | No |
| 13 | | | | | | | | | 27 | | | Slight |
| 14 | | | | | | | | | 27 | | | |
| 15 | | | | | | | | | 30 | | | No |
| 16 | 7 × 10¹⁴ | 8 × 10¹⁰ | 20 | | | 20 | | | 33 | 33 | | |
| 17 | 6 × 10¹⁴ | 7 × 10¹⁰ | 22 | | | 22 | | | 33 | 33 | | |
| 18 | 1 × 10¹³ | 8 × 10¹¹ | 18 | | | 20 | | | 32 | 33 | | |
| 19 | 6 × 10¹⁵ | 3 × 10¹⁰ | 20 | | | 20 | | | 28 | 28 | No | |
| 20 | (2 × 10¹³) | (4 × 10⁹) | (22) | (19) | (10) | (18) | | | 22 | 21 | | |
| 21 | | 5 × 10¹³ | | | | | | | 29 | 27 | | |
| 22 | 6 × 10¹⁵ | 3 × 10¹⁰ | 20 | | | 20 | | | 13 | 13 | | Yes |
| Comp. Examples | | | | | | | | | | | | |
| 1 | 4 × 10¹³ | 5 × 10⁹ | 11 | | | | | 0.9 | | | Separation[2] | |
| 2 | 1 × 10¹³ | 7 × 10¹¹ | 13 | 0.9 | 9 | 2 | | | | | Separation | |
| 3 | 9 × 10¹⁴ | 6 × 10¹² | 7 | 0 | 4 | 0.3 | | | | | | |
| 4 | 5 × 10¹² | 9 × 10⁷ | 17 | 4 | 11 | 10 | | | | | | |
| 5 | 3 × 10¹³ | 9 × 10⁹ | 19 | 12 | 10 | 18 | | | | | Partial separation | |
| 6 | | | — | | | | | 0.1 | | | | |
| 7 | | | | | | | | | 10 | | | Yes |
| 8 | | | | | | | | | 8 | | | |
| 9 | | | | | | | | | 12 | | | |
| 10 | | | | | | | | | 6 | | | Separation |

[1] Unless otherwise stated, 1 month at 65° C. and 80% RH
[2] Cinditioning chamber 5 years & outdoors 1 month
[3] Unless otherwise stated, figures in brackets are estimates

What is claimed is:

1. A structural member comprising a carbon fiber reinforced plastic material stuck to a surface of a light metal material via an adhesive agent layer of thickness from 10 μm to 500 μm,
wherein the adhesive agent layer has a first volume resistivity in accordance with JIS K6911 (1995) of at least 1×10¹³ Ω.cm, a first adhesive strength at room temperature in accordance with JIS K6850 (1994) of at least 15 MPa and a second volume resistivity in accordance with JIS K6911 (1995) of at least 1×10⁹ Ω.cm, after the adhesive agent has been exposed for 40 days to an atmosphere of temperature 65° C. and relative humidity 85%,
and wherein the thickness of the carbon fiber reinforced plastic is from 1/100 to 1/3 of the thickness of the light metal material.

2. Light metal/carbon fiber reinforced plastic-made structural members according to claim 1 which are characterized in that the thickness of the adhesive agent layer is from 20 μm to 500 μm.

3. Light metal/carbon fiber reinforced plastic-made structural members according to claim 1 which are characterized in that the thickness of the adhesive agent layer is from 50 μm to 500 μm.

4. Light metal/carbon fiber reinforced plastic-made structural members according to claim 1 which are characterized in that the volume resistivity of the adhesive agent layer when moisture has been absorbed is at least 1×10¹⁰ Ω.cm.

5. Light metal/carbon fiber reinforced plastic-made structural members according to claim 1 which are characterized in that the adhesive strength when moisture has been absorbed is at least 9 MPa.

6. Light metal/carbon fiber reinforced plastic-made structural members according to claim 1 which are characterized in that the adhesive strength at 60° C. is at least 8 MPa.

7. Light metal/carbon fiber reinforced plastic-made structural members according to claim 1 which are characterized in that the adhesive agent is a cold curing type.

8. Light metal/carbon fiber reinforced plastic-made structural members according to claim 1 which are characterized in that the adhesive agent is an epoxy adhesive containing a silane coupling agent, or a phenolic resin adhesive.

9. Light metal/carbon fiber reinforced plastic-made structural members according to claim 1 which are characterized in that the light metal is aluminium-based.

10. Light metal/carbon fiber reinforced plastic-made structural members according to claim 1 which are characterized in that an oxide layer of thickness 3 to 40 μm is formed on the surface of the light metal.

11. Light metal/carbon fiber reinforced plastic-made structural members according to claim 1 which are characterized in that the adhesive agent is an epoxy adhesive agent containing inorganic material.

12. Light metal/carbon fiber reinforced plastic-made structural members according to claim 1 which are characterized in that the carbon fiber reinforced plastic contains non-electroconductive reinforcing fibre.

13. Light metal/carbon fiber reinforced plastic-made structural members according to claim 1 which are characterized in that the light metal is a hollow material.

14. Light metal/carbon fiber reinforced plastic-made structural members according to claim 1 which are characterized in that the thickness of the carbon fiber reinforced plastic is from 1/50 to 1/2 that of the thickness of the light metal material.

15. Light metal/carbon fiber reinforced plastic-made structural members according to claim 1 which are characterized in that they are impact energy absorbing members, and the thickness of the carbon fiber reinforced plastic is from 1/100 to 1/3 that of the thickness of the light metal material.

16. Light metal/carbon fiber reinforced plastic-made structural members according to claim 1 which are characterized in that the strength of the carbon fibre contained in the carbon fiber reinforced plastic lies within the range 3.5 GPa to 10 GPa.

17. Light metal/carbon fiber reinforced plastic-made structural members according to claim 1 where at least two types of adhesive agent have been used.

18. Light metal/carbon fiber reinforced plastic-made structural members according to claim 1 which are characterized in that the corner portions of the members are rounded to a radius of from 1 mm to 10 mm.

19. Light metal/carbon fiber reinforced plastic-made structural members according to claim 1 which are characterized in that they are structural materials in which a carbon fiber reinforced plastic material has been stuck to the surface of a light metal material, and the regions other than the adhesion face of said carbon fiber reinforced plastic material are covered with an insulating material.

20. Light metal/CFRP-made structural members according to claim 15, wherein said members are impact energy absorbing members of a motor vehicle.

21. Light metal/CFRP-made structural members according to claim 15, wherein said members are bumper reinforcing materials or impact beams.

* * * * *